US012734471B2

(12) United States Patent
Bower et al.

(10) Patent No.: US 12,734,471 B2
(45) Date of Patent: Sep. 15, 2026

(54) EMBEDDING VARIABLE SLIT WIDTH EMBOSSED FILTER MEDIA PACKS

(71) Applicant: Baldwin Filters, Inc., Cleveland, OH (US)

(72) Inventors: Erik R. Bower, Kearney, NE (US); Levi W. Dexter, Elm Creek, NE (US); Joshua W. Witte, Kearney, NE (US)

(73) Assignee: Baldwin Filters, Inc., Cleveland, OH (US)

( * ) Notice: Subject to any disclaimer, the term of this patent is extended or adjusted under 35 U.S.C. 154(b) by 571 days.

(21) Appl. No.: 18/344,959

(22) Filed: Jun. 30, 2023

(65) Prior Publication Data

US 2024/0042361 A1 Feb. 8, 2024

Related U.S. Application Data

(60) Provisional application No. 63/386,037, filed on Dec. 5, 2022, provisional application No. 63/395,799, filed on Aug. 6, 2022.

(51) Int. Cl.
*B01D 46/00* (2022.01)
*B01D 46/52* (2006.01)

(52) U.S. Cl.
CPC ..... *B01D 46/0005* (2013.01); *B01D 46/0001* (2013.01); *B01D 46/0015* (2013.01);
(Continued)

(58) Field of Classification Search
CPC ............ B01D 46/0001; B01D 46/0005; B01D 46/521; B01D 46/525–527;
(Continued)

(56) References Cited

U.S. PATENT DOCUMENTS 5,820,646 A 10/1998 Gillingham et al.
9,132,371 B2 9/2015 Heim et al.
(Continued)

FOREIGN PATENT DOCUMENTS

DE 202014100770 U1 3/2014
EP 2627890 B1 11/2015
(Continued)

OTHER PUBLICATIONS https://www.mann-hummel.com/en/company/credentials/air-cleaner-system-for-mercedes-benz-engines.html; at least as early as Aug. 18, 2022.

*Primary Examiner* — Robert Clemente
(74) *Attorney, Agent, or Firm* — Reinhart Boerner Van Deuren P.C.

(57) ABSTRACT

A filter cartridge is provided. The filter cartridge includes a pack of filter media having an inlet face and an outlet face. The filter media pack further includes opposite first and second sides and opposite first and second ends. The sides and ends extend transversely between the inlet and outlet faces. The sides also extend transversely between the ends such that each end has an external non-planar, curved or multifaceted geometry. The filter cartridge further includes a pair of end caps located against each end of the filter media pack. Each end cap has an internal surface with a geometry closely matching the geometry of the associated filter media pack end. Further, an adhesive is disposed between the filter media pack and the end caps to secure them together.

39 Claims, 16 Drawing Sheets

(52) U.S. Cl.
CPC ........ *B01D 46/521* (2013.01); *B01D 2265/04* (2013.01); *B01D 2279/60* (2013.01)

(58) Field of Classification Search
CPC ........ B01D 2275/206; B01D 2275/208; B01D 2279/60; B01D 2265/04
See application file for complete search history.

(56) References Cited

U.S. PATENT DOCUMENTS

| | | | | |
|---|---|---|---|---|
| 9,724,635 | B2 | 8/2017 | Merritt et al. | |
| 10,610,815 | B2 * | 4/2020 | Burton | B01D 46/64 |
| 11,235,270 | B2 | 2/2022 | Tate et al. | |
| 11,406,924 | B2 | 8/2022 | Krull | |
| 2007/0193236 | A1 | 8/2007 | Merritt | |
| 2008/0250763 | A1 * | 10/2008 | Widerski | B01D 46/525 55/357 |
| 2012/0110962 | A1 * | 5/2012 | Dewit | B01D 46/0005 55/357 |
| 2017/0036156 | A1 * | 2/2017 | Coulonvaux | B01D 46/527 |
| 2018/0056225 | A1 * | 3/2018 | Dirnberger | B01D 39/18 |
| 2018/0333668 | A1 | 11/2018 | Krull et al. | |
| 2019/0070531 | A1 | 3/2019 | Medina et al. | |
| 2020/0324237 | A1 | 10/2020 | Moers et al. | |
| 2021/0039031 | A1 | 2/2021 | Neef et al. | |
| 2022/0008853 | A1 * | 1/2022 | Dexter | B01D 46/521 |
| 2022/0072465 | A1 * | 3/2022 | Counlonvaux | B01D 46/0002 |

FOREIGN PATENT DOCUMENTS

| | | | |
|---|---|---|---|
| WO | 2008/037163 | A1 | 4/2008 |
| WO | 2021/206889 | A1 | 10/2021 |
| WO | 2022/023512 | A1 | 2/2022 |

* cited by examiner 56
78
46

EMBEDDING VARIABLE SLIT WIDTH EMBOSSED FILTER MEDIA PACKS

CROSS-REFERENCE TO RELATED PATENT APPLICATIONS

This patent application claims the benefit of U.S. Provisional Patent Application No. 63/386,037, filed Dec. 5, 2022, and also claims the benefit of U.S. Provisional Patent Application No. 63/395,799, filed Aug. 6, 2022; the entire teachings and disclosure each of these provisional applications are incorporated herein by reference thereto.

FIELD

This invention generally relates to a filter cartridge, which may be used in an engine air filter assembly, and more particularly to end caps for sealing ends of filter media packs of such filter cartridge.

BACKGROUND

Filters cartridges are commonly employed to remove particulate matter flowing in a fluid stream, such as the removal of dust and other particulate from air. These filter cartridges often incorporate a filter media pack, a structural support, and seal.

A variety of filter media packs are known in the art, for example the stacked fluted filter media pack described and shown in U.S. Pat. No. 5,820,646 to Gillingham et al.; and the embossed filter media pack described and shown in U.S. Pat. No. 11,235,270 to Tate et al.

When an air filter cartridge is used in an engine air filter assembly, it can deform under higher differential pressures. If support structure is used with the cartridge, the capacity of the cartridge can be limited, and the inlet flow face of the filter can be reduced.

The state of the art includes different examples. WO 2022/023512 to Schmid et al. provides examples of a filter medium folded in a zig-zag-shape with discontinuous edge bonds.

U.S. Pat. No. 9,724,635 to Merritt et al. and U.S. Pat. No. 11,406,924 to Krull provide end caps with a flat inner surface. These involve rectangular filter media pack configurations and rectangular housing installations. For conventional end cap attachment, as in the '635 and '924 patents, a liquid potting material is dispensed into end caps and cured. Another approach disclosed in WO 2021/206889 to Calcaterra et al. involves bonding the end caps to the filter media pack utilizing a solidified heat-activated adhesive. However, this also involves end caps with a flat inner surface and used on opposite flow ends of tubular rings of pleated filter media for a different liquid filter application.

In view of the foregoing, it will be seen that the present disclosure provides an improved design for a filter cartridge to provide cartridge support while reducing capacity limitations or reliability concerns that can sometimes occur in the art.

BRIEF SUMMARY

As will be explained in greater detail below, a filter assembly constructed according to the teachings herein has enhanced structural support and protection of its associated filter media, and a geometry that can maximize the inlet flow face available for filtration. The subject cartridge includes a support structure on each end of the pleat pack but has a large capacity as the cartridge has a geometry that matches the cavity of the filter housing, as well as a large inlet flow face with low inlet restriction. The cartridge is also relatively easy and straightforward to manufacture and assemble, which can reduce cost.

The filter assembly includes a block or pack of filter media located between a pair of endcaps. The ends of the block/pack are non-planar, e.g., curved or multifaceted, and the end caps have a similar, and preferably a closely matching, curved or multifaceted geometry.

The filter media pack may be embodied as any type of media, e.g., fluted, pleated, etc., and as such, the invention is not limited to any particular type of media. Fluted filter media packs with alternating strips of facing and fluted media joined by inlet and outlet seal beads can be used. However, it has been found that the filter cartridge performs well and is advantageous with a deep-pleated filter media. Deep pleated media also does not require the flute seal closures associated with fluted type filter media packs.

The pleat pack is initially formed and may be located within a frame. The pleat pack can be formed from a single strip (e.g., continuous sheet) of media, which is appropriately embossed and pleated into a rectangular pleat pack, and then cut along its side edges to shape the ends. The geometry of the ends of the filter cartridge are chosen so as to substantially correspond to the inside surface of the filter housing assembly and allow fairly tight installation therein.

The pleats extend from one end of the pack to the other, in vertical, adjacent, surface-to-surface relationship to one another, with an entrance opening on an upstream side of the pleat block, and an exit opening on the opposite, downstream side. Fluid entering the entrance opening has to traverse the media strip (and be filtered) in order to pass to the exit opening.

The frame likewise has a geometry which matches the configuration of the pleat pack and supports the pleat pack in its pleated configuration. The frame has a grate with appropriate openings on its upstream and downstream sides that are sized so as not to significantly limit flow through the pack. The frame does not cover the side edges of the pleat pack. An oval mouth of the frame supports internal cross pieces across the outlet face the filter media pack for additional support, as well as a preformed gasket that can be glued directly to the mouth and provides a fluid seal against a corresponding opening in the filter housing.

The end caps are relatively thin and may have supporting rib structure, and the inside and outside curvature of the end caps preferably closely matches the curvature of the ends of the filter media pack, such that the inside surface of the end cap can be located against the ends of the pleat peaks, and the outside surface of the end caps corresponds essentially to the inside surface of the filter housing. The end cap may include short lips or edges which extend from the end cap inwardly toward a center axis of the cartridge to serve as a receptacle for the potting adhesive (urethane), as well as to locate and support the frame enclosing the filter media pack.

The cartridge provides an integrated component once the various components are affixed together. Either a rigid or liquid potting compound can be used to affix the end caps to the filter media pack, and within the frame, and to prevent fluid bypass at the ends of the pleats. If a rigid epoxy is used in the filter, integrating a snapping feature in all of the plastic components will allow for a dry assembly of the filter before it is run through an oven that will cure the potting compound. Using an epoxy to dry assemble the filter will allow the potting compound to be assembled into the endcaps as a rigid structure before the compound needs to be cured.

If a liquid potting compound is used, the endcaps preferably may have specifically designed features in the bottom of the potting reservoir to optimize the minimum quantity of potting compound needed to seal the pleat tips. There are many design styles that may be used as "baffling" for the liquid potting compound to pool in before it cures into a solid/foam structure.

Accordingly, one inventive aspect is directed toward a filter cartridge that better accommodates at least one bulged face of a filter media pack. The filter media pack has a filter media sheet, and includes an inlet face, an outlet face, opposite first and second sides, and opposite first and second ends. The sides and the ends extend transversely between the inlet face and the outlet face. In addition, the sides extend transversely between the ends, with a first end bulging outwardly or inwardly from the opposite sides to define a first bulged face. A first adhesive end wall is embedded into the first bulged face of the first end.

Another inventive aspect is directed toward a filter cartridge with end caps that accommodate a curved or multi-faceted geometry of a filter media pack. The filter media pack has an inlet face, an outlet face, and ends. The ends extend transversely to the inlet and outlet faces such that each end has an external non-planar, curved or multifaceted geometry. The filter cartridge further includes a pair of end caps located against each end. Each end cap has an internal surface with a geometry closely matching the geometry of the associated filter media pack end. Further, the adhesive is disposed between the filter media pack and the end caps to secure them together.

Several structures, features, or additional aspect or processes may be used in any of the aspects above (or otherwise provided herein) such as those detailed in any of the below summary section paragraphs that may be used separately and/or in combination with each other.

In addition to the first end bulging, the second end may also bulge outwardly or inwardly from the opposite sides to define a second bulged face, with a second adhesive end wall embedded into the second bulged face of the second end.

The filter cartridge may further include first and second preform end caps, which retain the first and second adhesive end walls, respectively. Each preform end cap includes a support panel defining an arcuate or multifaceted inner support face that provides or retains one of the adhesive end walls. Alternatively, either or both of the adhesive end walls may provide the end caps, for example mold-in-place end caps.

The filter cartridge may further include a frame mounted over either the inlet face or the outlet face. The frame supports an annular gasket with a freely defined sealing surface. Further, the frame may overlap with each of the first and second preform end caps.

The frame can be bonded with the first and second preform end caps via the first and second adhesive walls, respectively. Alternatively, the frame may be snap-fitted with the first and second preform end caps.

The filter cartridge may include a permeable baffle holding adhesive of the adhesive end wall within the first and second preform end caps and integrally bonded between the first and second preform end caps and the first and second bulged faces, respectively.

In some embodiments, the first bulged face is multifaceted defining a plurality of wall segments and can define an outwardly multifaceted ridge face. In other embodiments, and more preferably, the first bulged face curves to define a curved end face. For example, preferably, the first bulged face may protrude outwardly to define an outwardly curved ridge face.

The filter cartridge preferably includes a preform end cap that retains the first adhesive end wall. Such a preform end cap may have a pair of curved (or multifaceted) ledges and a pair of linear edges extending along a border of a support panel to provide an inward facing border wall, which defines a curved (or multifaceted) potting cavity over the curved (or multifaceted) support face. In addition, one curved (or multifaceted) ledge overlaps the inlet face, and the other curved (or multifaceted) ledge overlaps the outlet face. Further, the linear edges traverse between the curved (or multifaceted) ledges of the support panel and overlap opposing sides of the filter media pack.

Such a preform end cap may also include a plurality of ribs extending from a curved (or multifaceted) outer support face of the support panel opposite the curved (or multifaceted) inner support face. The curved (or multifaceted) ledges may also have outward extended portions that, in conjunction with the linear edges, provide an outward border wall over the curved (or multifaceted) outer support face, with the ribs extending across the outward border wall to provide a rib support network.

The adhesive end walls may be accomplished with cured liquid adhesive retained by the preform end caps. For example, the liquid adhesive includes a urethane, a hotmelt, a plastisol, a thixotropic adhesive material (e.g., Sikaflex style) or an epoxy. Alternatively, the adhesive end walls may be accomplished with preformed heat activated strips that have been heat activated embedded into the filter media pack. For example, the preformed heat activated strips include at least one of epoxy, a urethane, and a hot melt that, at a temperature of at least 120 degrees Celsius, transforms into a liquid form suitable for embedding.

Preferably, the filter media pack is a pleat pack with the filter media sheet folded into a plurality of pleats that provide a plurality of inlet pleat tips at the inlet face and a plurality of outlet pleat tips at the outlet face. For example, the pleat pack may be variable width, with the pleats defining a width extending between opposed ends, with at least some of different pleats having a widest width and narrowest width, with the widest width greater than the narrowest width by at least 1.0 centimeter, and typically by at least 3 centimeters (and often more typically at least 6 centimeters or more).

As an alternative to a pleat pack, a fluted filter pack is provided with a stack of fluted sheets and a stack of face sheets, with alternating inlet and outlet seal strips the adjacent fluted and face sheets at the inlet face and the outlet face, respectively. And similarly, with at least some of different of the stacked fluted/face sheets having a widest width and narrowest width, with the widest width greater than the narrowest width by at least 1.0 centimeter, and typically by at least 3 centimeters (and often more typically at least 6 centimeters or more).

Preferably, the filter media pack may be configured in an oval, rounded, or race-track configuration.

When a preform end cap is used, the perform end cap retains the first adhesive end wall and includes a support wall facing the first bulged face, with a contour matched to the first bulged face.

Further, a plurality of retainer baffles may be arranged at various locations along a support wall of the preformed end cap (the support wall facing the bulged face). The retainer baffles include at least some retainer baffles arranged away from an apex of the support wall configured to retain uncured liquid adhesive that forms the first adhesive end wall. In other words, at least some of the retainer baffles are in areas away from the bottom area where liquid adhesive would gravitationally pool during assembly and adhesive fixing.

A preform end cap can be used as the adhesive end wall. For example, a preform end cap of thermoplastic polymer material can having an inner surface directly embedded into the first bulged face of the first end. In such case, the thermoplastic polymer material provides the adhesive end wall as it can be softened and embedded for assembly.

The filter cartridge may further include a frame that supports the filter media pack, with each end cap having a lip or edge geometry that locates and supports the frame.

The filter cartridge may also have a U-shaped grate, with a perforated end panel mounted over either the outlet face or the inlet face, and with perforated side panels mounted over opposed sides. The perforated end panel and the perforated side panels are connected at corners, preferably by living hinges for example.

In a preferred filter media pack, the ends bulge outwardly from the opposite sides to define a first outwardly bulged curved (or multifaceted) face and a second outwardly bulged curved (or multifaceted) face.

The potting adhesive can form first and second adhesive end walls embedded into the first and second outwardly bulged curved (or multifaceted) faces to seal the filter media pack to unfiltered airflow through the ends.

The adhesive end walls may be dispensed in a liquid form into the end caps prior to application to the outwardly bulged curved (or multifaceted) faces, and thereafter cured to solidify.

Each preferred end cap may include a support wall facing the outwardly bulged curved (or multifaceted) face, with a curved or multifaceted contour matched to the outwardly bulged curved (or multifaceted) face. Further, the support wall may include a plurality of retainer baffles configured to retain uncured liquid adhesive.

As an alternative to liquid adhesive, the adhesive may be provided by preformed heat activated strips that have been heat activated embedded into the filter media pack. For example, the preformed heat activated strips include at least one of epoxy, a urethane, and a hot melt that, at a temperature of at least 120 degrees Celsius, transforms into a liquid form suitable for embedding.

Preferably, the filter cartridge further includes a frame mounted over either the inlet face or the outlet face. The frame may support an annular gasket with a freely defined sealing surface (for example, for releasable sealing with a housing). The frame may overlap with each of the end caps.

Another inventive aspect is directed toward a method for manufacturing a filter cartridge. The method involved creating a variable width filter media pack from a filter media sheet having a variable width. The created filter media pack includes an inlet face, an outlet face, opposite first and second sides, and opposite first and second ends. The sides and the ends extend transversely between the inlet face and the outlet face. Panels of the filter media sheet extend between the inlet face and the outlet face. The variable width extends between opposed ends such that different members of at least some of the panels have a different width, with a widest member of the panels providing widest width and a narrowest member of the panels providing narrowest width, with the widest width greater than the narrowest width by at least 1.0 centimeter (more typically by at least 3 centimeters and often by 6 centimeters or more), in a manner that at least the first end bulges outwardly or inwardly from the opposite sides to define a first bulged face. The method further involves embedding a first adhesive end wall into the first bulged face to seal the first bulged face.

According to the method, the second end can bulge inwardly or outwardly to define a second bulged face. Further, the method preferably embeds a second adhesive end wall into the second bulged face to seal the second bulged face.

The method preferably retains the first adhesive end wall in a preformed end cap during application to the first bulged face.

The method may dispense the first adhesive end wall into the preformed end cap in a liquid form prior to application to the first non-planar end face, and thereafter the liquid form is cured to solidify the first adhesive end wall.

As an alternative to liquid application, the method may involve placing the first adhesive end wall as preformed heat activated strips into the preform end caps. Preferably, at a temperature of at least 120 degrees Celsius, the preformed heat active strips are heated to a liquid form suitable for embedding. For example, after assembling the components of the filter cartridge with the preformed heat active strips over one or both opposed ends, the filter cartridge can be passed through an oven to activate the adhesive and embed into the filter media pack. However, it may be possible for lower temperature adhesives to be used, for example an adhesive that may be stored in a freezer, and that cure at room temperature, which is a contemplated embodiment.

In the method, lips of the preformed end cap may be overlapped over sides and inlet and outlet faces of the filter media pack.

In the method, frame may be arranged over the inlet face or the outlet face, and the preformed end cap and the frame are bonded with the first adhesive end wall.

In another embodiment, the method may comprise molding the first adhesive end wall to the first bulged face with a mold, and releasing mold from the first adhesive end wall such that the first adhesive end wall provides a mold-in-place end cap. For example, in an embodiment with two end caps, the method may involve molding the first and second adhesive end walls to the first and second bulged faces with at least one mold, and releasing the at least one mold from the first and second adhesive end walls such that the first and second adhesive end walls provide first and second mold-in-place end caps, respectively.

Another alternative for providing the adhesive end wall further comprises softening an inner surface of a thermoplastic polymer material of a preform end cap and applying the softened inner surface to the first bulged face to provide for the adhesive end wall via the thermoplastic polymer material of the preform end cap.

Other aspects, objectives, and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
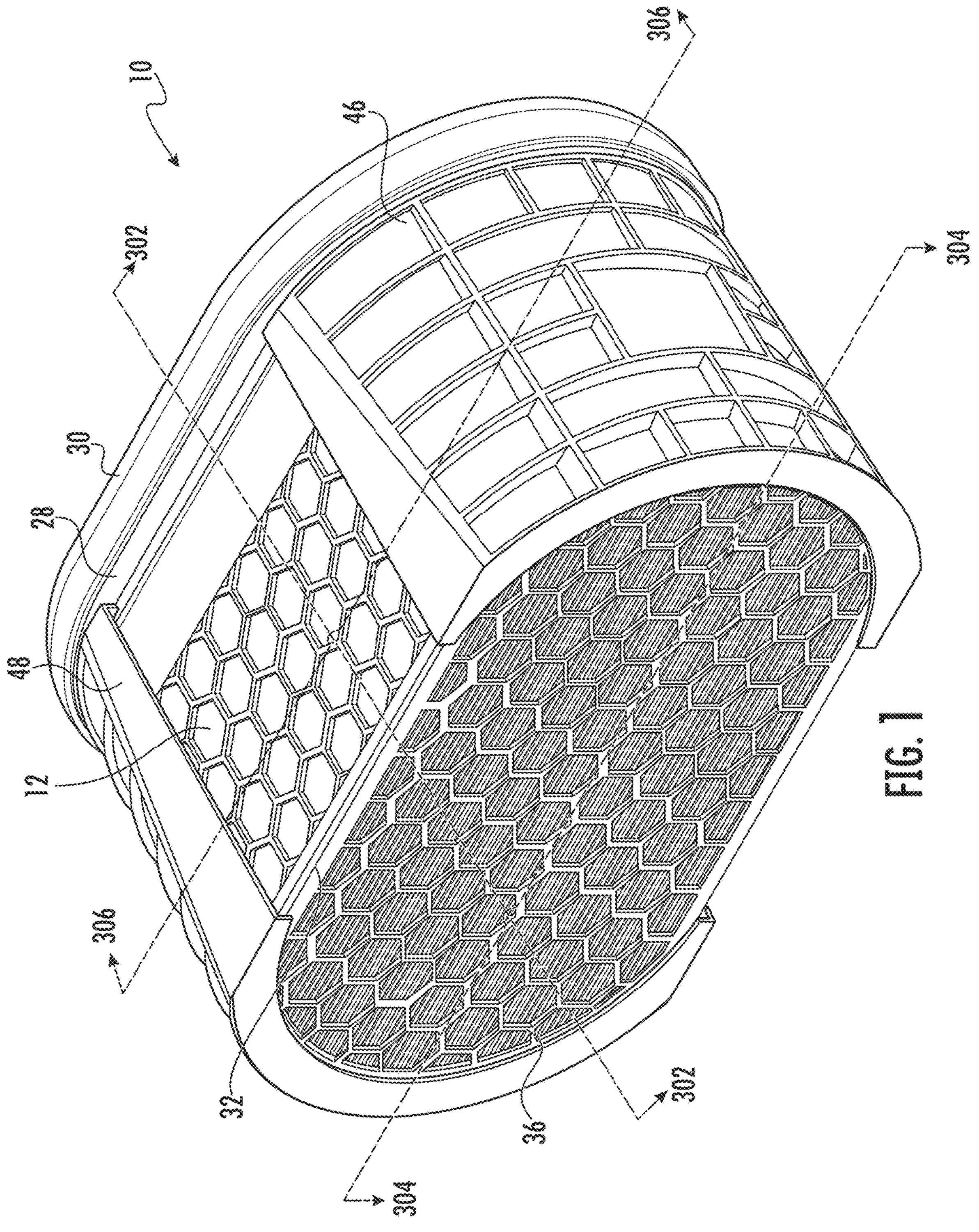
FIG. 1 shows an isometric view of an exemplary embodiment of a filter cartridge according to the teachings herein.

FIG. 1 illustrates a filter cartridge 10 according to an embodiment of the present invention. The filter cartridge 10 includes a pair of end caps 46, 48 and a filter media pack 12 situated between the end caps 46, 48. The filter media pack 12 has a variable width (shown in the lengthwise direction of the filter media pack shown in FIG. 1) provided by different panel widths in the pleated filter media sheet 14 (or filter media sheets of fluted media packs when considered collectively). The variable width results in a filter media pack that has at least one non-planar end face, for example in this embodiment two curved faces at ends 24, 26.

Figure 2:
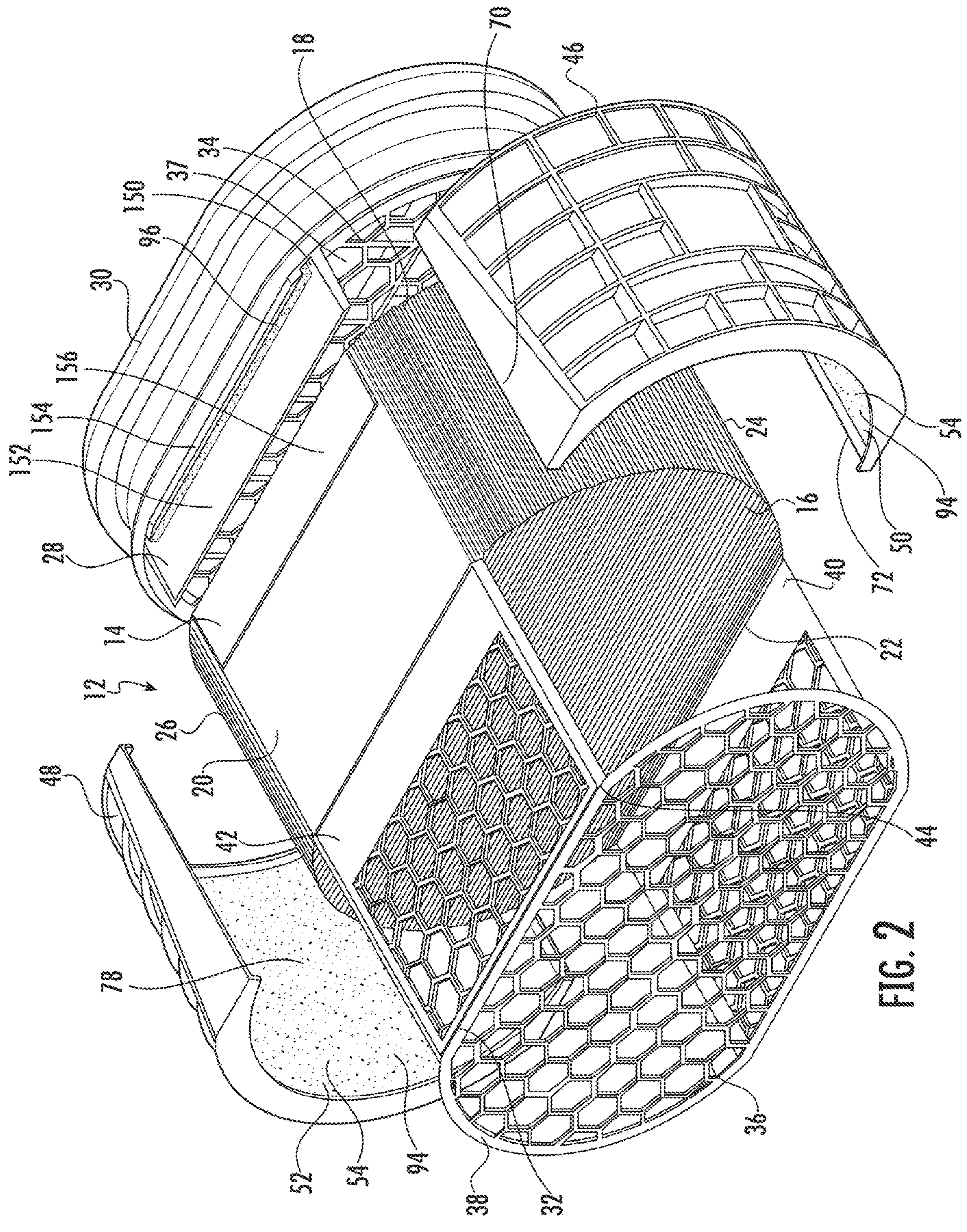
FIG. 2 shows an exploded isometric assembly view of the filter cartridge of FIG. 1 prior to assembly with the end caps.
Figure 6:
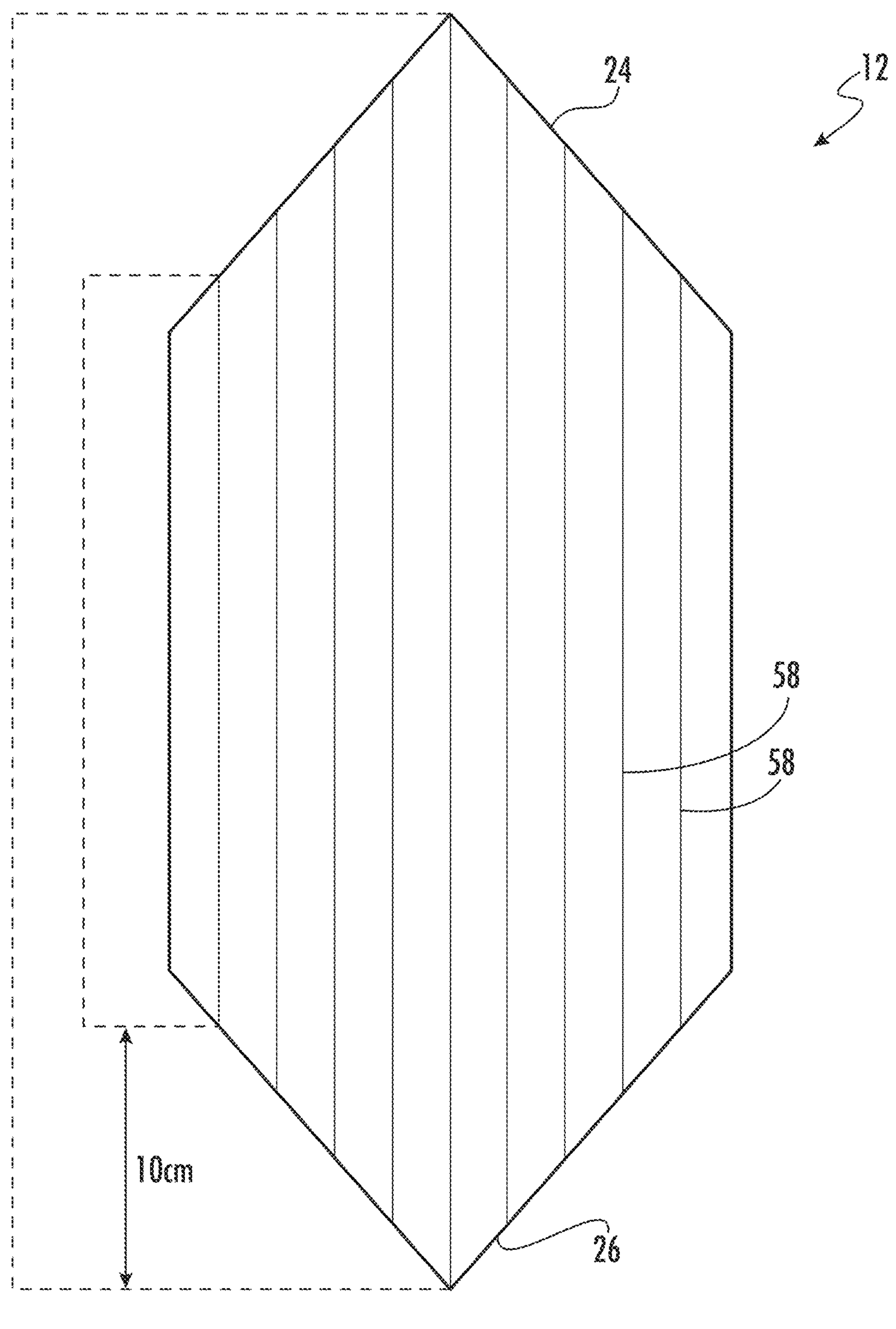
FIG. 6 shows an isometric view of an alternative embodiment of the filter media pack with multifaceted ends that may be used in a filter cartridge similar to that of FIG. 1, but with the end caps of FIG. 1 being preferably multifaceted with two faces of a triangle rather than the curved end caps to match the multifaceted ends.

While a curved design is shown in FIGS. 1-2, as shown in FIG. 6 the ends 24, 26 may also be multifaceted to comprise a few clear defined flat surfaces of equal or unequal areas/sizes, (e.g., configuration of half of a hexagon or octagon for example). However, after more than 4 flat surfaces on the ends 24, 26, the surface is considered curved, as a large number of facets effectively create a curve. Therefore, an end 24, 26 that is half of a decagon is considered curved herein, as would a configuration with even more facets.

Other alternative embodiments of the filter media pack 12 are oval or rounded and are intended for placement into the filter cartridge 10.

Each end cap 46, 48 has an arcuate (or multifaceted) inner support face 78 and matches the variable width geometry of the associated filter media pack end 24, 26 (see FIG. 2). Each end cap 46, 48 carries adhesive 94 that provides adhesive end walls 50, 52 that effectively seal closed the otherwise open ends 24, 26 of the filter media pack 12, thereby preventing unfiltered bypass of airflow. The adhesive end walls 50, 52, thereby force the unfiltered air flow to travel through the filter media sheet 14 of the filter media pack 12 as the air travels from the inlet face 16, toward the outlet face 18, preventing unfiltered air flow from travelling through the ends to the outlet face 18.

The filter cartridge 10 preferably includes a frame 28 helping to support the filter media pack 12, but also which can carry an annular gasket 30 that can serve as a housing seal to facilitate releasable sealing of the cartridge to a housing and/or duct (not shown).

The filter media pack 12 may be embodied as any type of media, e.g., fluted, pleated, etc., and as such, the invention is not limited to any particular type of media. However, it has been found that the filter cartridge 10 performs well and is advantageous with a deep-pleated filter media.

The annular gasket 30 has a freely defined external housing sealing surface. The gasket 30 may be made from any material capable of providing a gasket type seal, typically urethane (e.g., polyurethane), nitrile, or other similar rubber material. The gasket 30 can either be molded in place on the frame or preformed into its desired shape and is then fastened directly to the frame 28 either with adhesive or without the need for any additional adhesive materials (e.g., stretch/snap fit).

The end caps 46, 48 and the frame 28 can be bonded together via the adhesive 94, which is shown in FIG. 1 and cross-sections.

An alternative embodiment can have the pair of end caps 46, 48 snap-fitted onto the frame 28.

As illustrated in FIG. 1, the filter cartridge 10 preferably includes a grate 32 providing additional structural support to the overall filter cartridge 10 and protect the filter media pack 12 during operation. The grate 32 may be U-shaped as shown. The U-shaped grate 32 includes a central body portion 38 and wings that provide opposing sides 40, 42 on either side of the body portion 38 (see FIG. 2).

Each side 40; 42 is integrally connected to the body portion 38 via a living hinge 44. This living hinge 44 facilitates the initial formation of the grate 32 as a flat component, followed by its further bending into a U-shape.

The U-shaped perforated grate 32 is arranged on the filter media pack 12 such that its body portion 38 is adjacent to one of the faces 16, 18 of the filter media pack 12, and its sides 40, 42 are adjacent to the opposite sides 20, 22 of the filter media pack 12.

The frame 28 also preferably has a grate 34 with appropriate openings 37 on its upstream and downstream sides so as not to significantly limit flow through the filter media pack 12 (see FIG. 2).

Each of the grates 32, 34 include perforations 36, 37 that can be integrally molded into the grates. These perforations 36, 37 allow for a sufficient air flow to and from the face 16; 18 of the filter media pack 12 they are adjacent to in overlapping relation.

FIG. 2 illustrates an exploded assembly view of the filter cartridge 10 shown in FIG. 1, to illustrate on the component parts fit together. FIG. 2, better illustrates the filter media pack 12 crated by the filter media sheet 14, with the inlet face 16 and the outlet face 18, as well as opposite first and second sides 20, 22, which may be flat, and opposite first and second ends 24, 26, which may be curved (or multifaceted) as discussed above.

The sides 20, 22 and ends 24, 26 extend transversely between the inlet face 16 and the outlet face 18. The sides 20, 22 also run transversely between the ends 24, 26 such that the first end 24 bulges either outwardly or inwardly from the opposite sides 20, 22 to define a first bulged face, which as shown is an outwardly curved face. Similarly, the second end 26 bulges either outwardly or inwardly from the opposite sides 20, 22 to define a second bulged face, which as shown is an outwardly curved face.

The end caps 46, 48 are preformed prior to assembly, preferably as injection molded plastic parts (e.g., nylon), although metal or other materials are possible.

Each end cap 46, 48 defines a cavity for the reception of the adhesive.

The adhesive 94 bonds the filter media pack 12 and the U-shaped perforated grate 32 between the end caps 46, 48.

Figure 13:
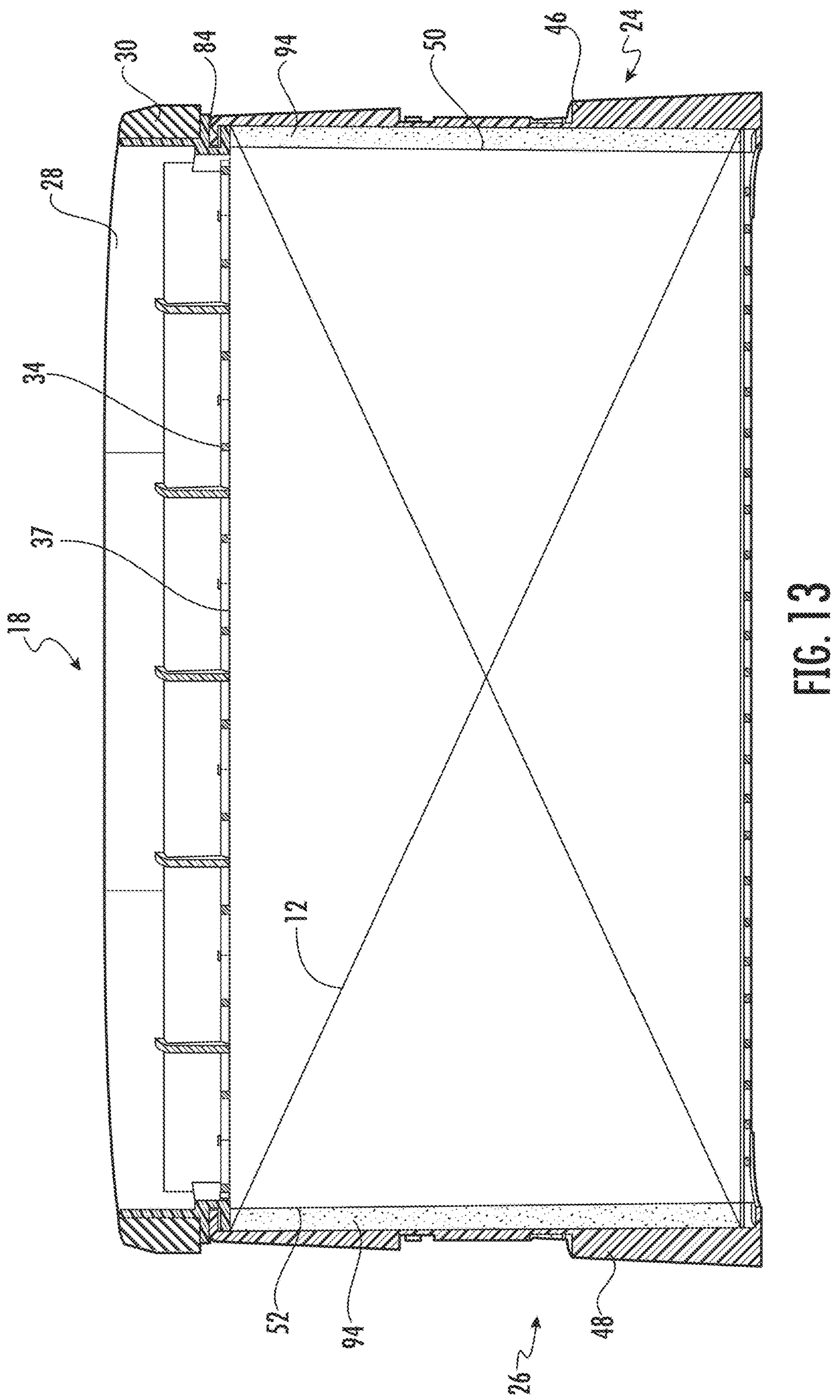
FIG. 13 shows a cross-sectional view of the filter cartridge of FIG. 1, taken along the line 304-304.
Figure 14:
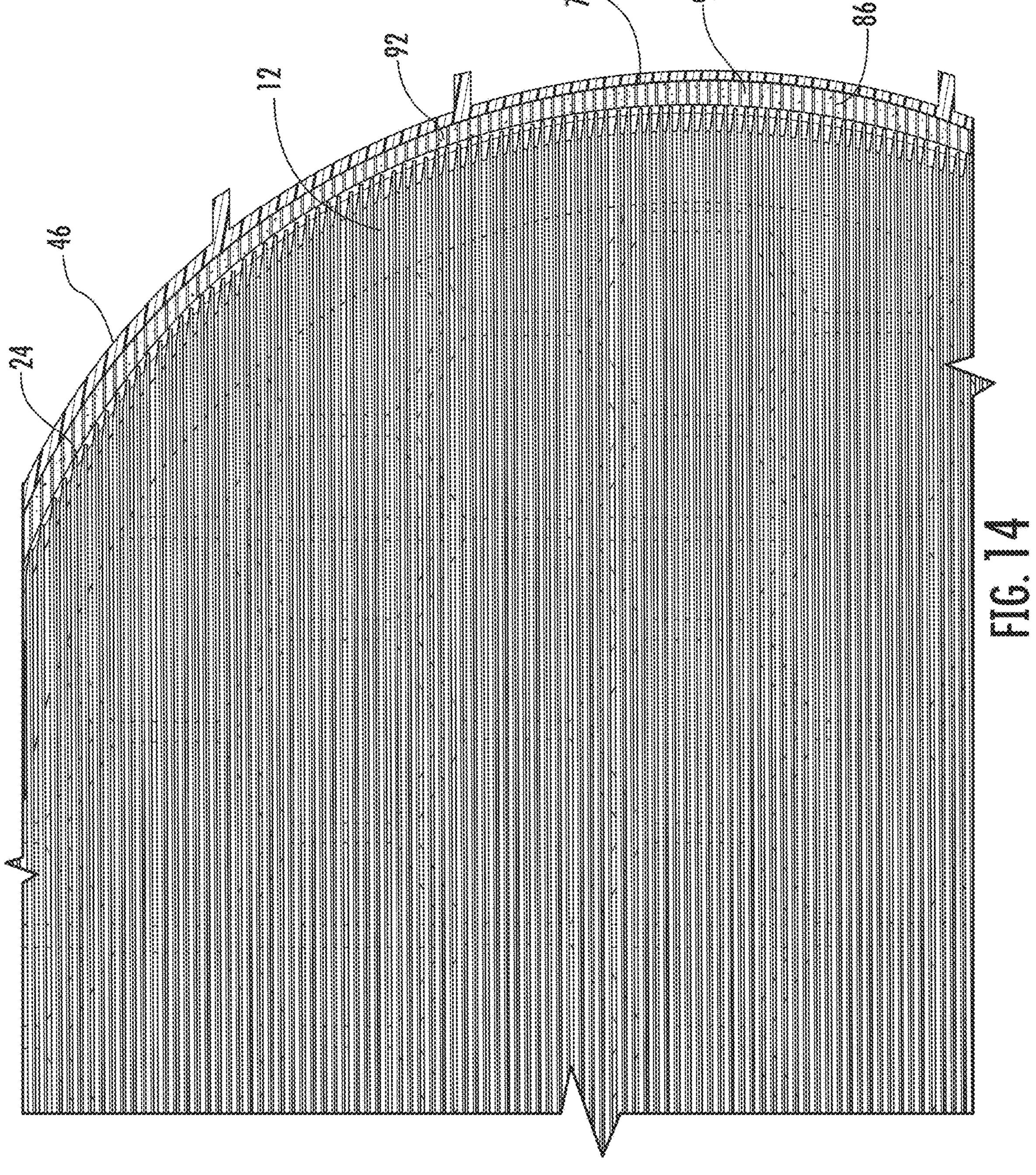
FIG. 14 shows an enlarged portion of a cross-sectional view of the filter cartridge of FIG. 1, taken along the line 306-306, with the end caps having integral baffles according to FIG. 9.

The adhesive 94 that may be retained by the end caps 46, 48 forms adhesive end walls 50, 52, shown in FIG. 2 and in cross-sections taken through the end caps in FIGS. 13-14, that are embedded into the first and second curved (or multifaceted) faces of the opposite ends 24, 26 to seal the filter media pack 12 against unfiltered airflow through the ends 24, 26. This association may include, for non-limiting example, retaining the adhesive end walls 50, 52 in the end caps 46, 48 during application to the bulged faces.

Figure 16:
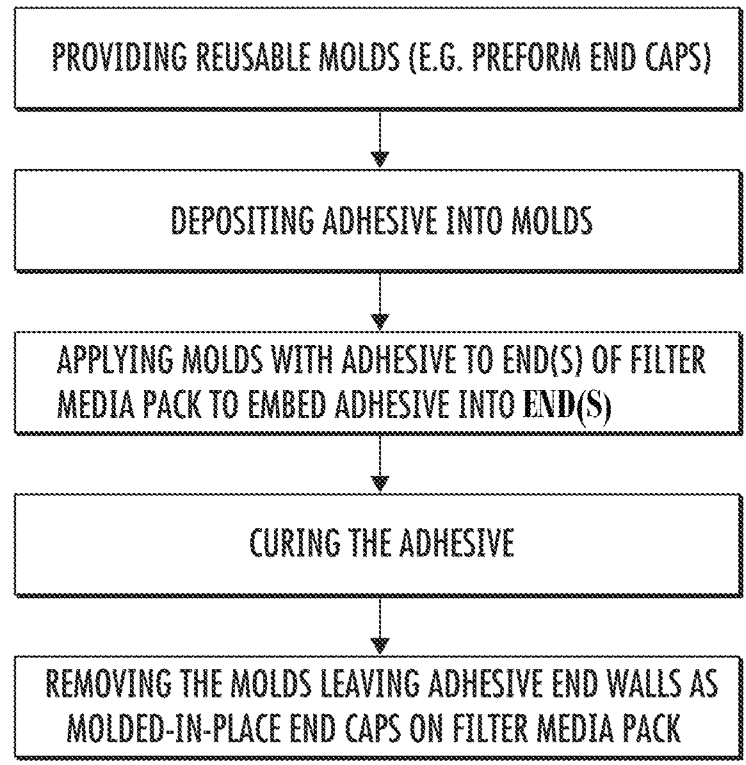
FIG. 16 shows a flow-chart of an alternative embodiment of FIG. 1, with molded-in-place end caps rather than the preformed end caps (for example, in which reusable molds akin to the preformed end caps would be used to mold-in-place the adhesive end walls).

Alternatively, the adhesive end walls 50, 52 may be applied in place, for example by reusable molds (configured similar to the end caps 46, 48), and once cured the adhesive end walls 50, 52 can also be considered to be and thereby provide the end caps of the filter cartridge 10. In this embodiment, the adhesive end walls 50, 52 would be molded-in-place end caps without a preform. The process for this alternative embodiment is shown in FIG. 16. The reusable molds would generally take the same form as the preformed end caps 46, 48, but would not remain with the cartridge once finished but used to create subsequent mold-in-place endcaps. For example, the molds can be configured the same or similar to preforms/end caps 46, 48, perhaps made out of aluminum or other reusable mold material and perhaps with multiple spaced standoffs along in the inner facing mold surface. Preferably, the preformed end caps 46, 48 are used in conjunction with the adhesive 94 to form the adhesive end walls 50, 52, and remain on the filter cartridge (rather than as molds) to provide additional structure support and a finished appearance to the filter cartridge.

In mold embodiments, either liquid adhesive or more preferably solid heat activated solid strips of adhesive may be used as the adhesive end walls 50, 52. For example, heat activated strips of adhesive can be placed in such a mold and then heated to embed the strips into the opposite ends 24, 26 of the filter media pack. For example, various embodiments of the subject invention can utilize an adhesive that is manufactured in a predetermined solid shape, e.g., a flat pliable sheet that is seated in a fixture/reusable mold (similar shape to preform end caps), and then run through an oven to soften/melt and embed into the opposite ends 24, 26. Once embedded the reusable molds are removed in which the adhesive end walls 50, 52 become the end caps on opposite ends 24, 26 of the filter cartridge 10.

Utilizing a heat-activated adhesive that is solid prevents the adhesive from running down during assembly and reduces multiple passes through an oven. Because the adhesive can be thixotropic in nature, once heat activates it, the media pack is pressed into the adhesive by gravity or some other mechanical means such as weighting in a fixture. The adhesive could be non-foaming or foaming. Foaming would be activated by heating to ensure the material adequately bonds the media to the end cap. An example of a heat-activated adhesive is L&L Products L-2806 or L-4161 epoxies. Other examples and types of materials that are heat-activated adhesives that could be used as adhesive end walls 50, 52 include urethanes and hot melts.

Additionally, a heat-activated adhesive could contain a material that is excited by an induction coil. Metal particles are such a material, but any material excited by an induction coil to produce heat could be used. As before, the adhesive could be an epoxy, urethane, or hot melt. A filter with this material is assembled and placed into a set of induction coils. These coils excite a material inside of the adhesive creating heat—similar to being placed into a convection oven. The heat activates the material and bonds the filter together in one process step. In this embodiment, the medium may require curing prior to activating the adhesive. However, it does not require ovens to cure the material.

The adhesive end walls 52, 54 may also be provided by thermoplastic material of the preformed end caps 46, 48. Thermoplastic materials are polymers (e.g. nylons/polyamides, ABS, PVC, polyethylene, polypropylene, etc.) that can be melted and may be recast almost indefinitely. They are molten when heated and harden upon cooling. For example, the inner surfaces 78 of the end caps 46, 48 can be softened (e.g. typically melted) and direct embedded into the opposite ends 24, 26 of the pack 12. Energy such as radiant heat directly applied to the inner surfaces 78 may be used. Another option is placing the end caps 46, 48 on ends 24, 26 when cool/solid and then exciting such as with ultrasonic energy that creates friction at the interface between the pack/end cap and welds the plastic material of end caps directly to the pack (typically one end cap at a time but simultaneously is also an option). In particular, heat created by radiant, ultrasonic or otherwise will soften (e.g., melt) the polymer material of the preformed end caps 46, 48 and direct embeds and welds the material in which case the polymer material/inner portion of the end caps 46, 48 (e.g., embedded portion) provides and thereby integrally retains the adhesive end walls 52, 54, which can be understood with reference to FIG. 2.

Additionally, as shown in FIG. 2 (see also FIG. 12), a bead of adhesive 96 is provided on the frame 28 (preferably situated in a channel 150 of the frame 28 between an inner blade 152 and an outer retainer lip 154). This bead of adhesive 96 seals the outer most pleat 156 to the frame 28 and thereby preventing unfiltered bypass therebetween. Further, this bead of adhesive 96 overlaps and joins to the pool of adhesive 94 at the opposing end caps 46, 48 (for example due to adhesive 94 carried near linear ledges 70, 72 that are arranged to overlap with the bead of adhesive 96), such that an entire periphery of the filter media pack 12 is sealed by adhesive (e.g., adhesive 94 and adhesive 96) to prevent unfiltered air flow.

This bead of adhesive 96 can also be used to secure the U-shaped grate 32 to the frame 28. As may be seen in FIG. 2 and also FIG. 12, the outer opposing sides 40, 42 of the U-shaped grate 32 are installed into a pocket of the outermost pleat 156 and together received in the channel 150, and adhesive 96 may also optionally be applied along the outside of the opposing sides 40, 42 of the U-shaped grate 32 if desired.

As will be understood, another bead of the same adhesive 96 (along with channel 150 of the frame 28 between an inner blade 152 and an outer retainer lip 154) is also provided on the opposite side 22, such that the view rotated 180 degrees in FIG. 2 appears the same as that shown in FIG. 2 and the above two paragraphs also describe the sealing of the outermost pleat 156 and joinder of the U-shaped grate 32 along the other side 22.

In one embodiment shown in FIG. 2, the end caps 46, 48 are coupled to the ends 24, 26 of the filter media pack 12 by liquid adhesive 54. For example, the end caps 46, 48 may be coupled with a urethane, a hotmelt, a plastisol, a thixotropic adhesive material (e.g. Sikaflex style) or an epoxy that is first applied in liquid form into the cavity of the end caps 46, 48 and then applied to the ends 24, 26 before curing. Once the end caps 46, 48 are applied, the liquid adhesive 54 cures creating the adhesive end walls 50, 52.

Figure 11:
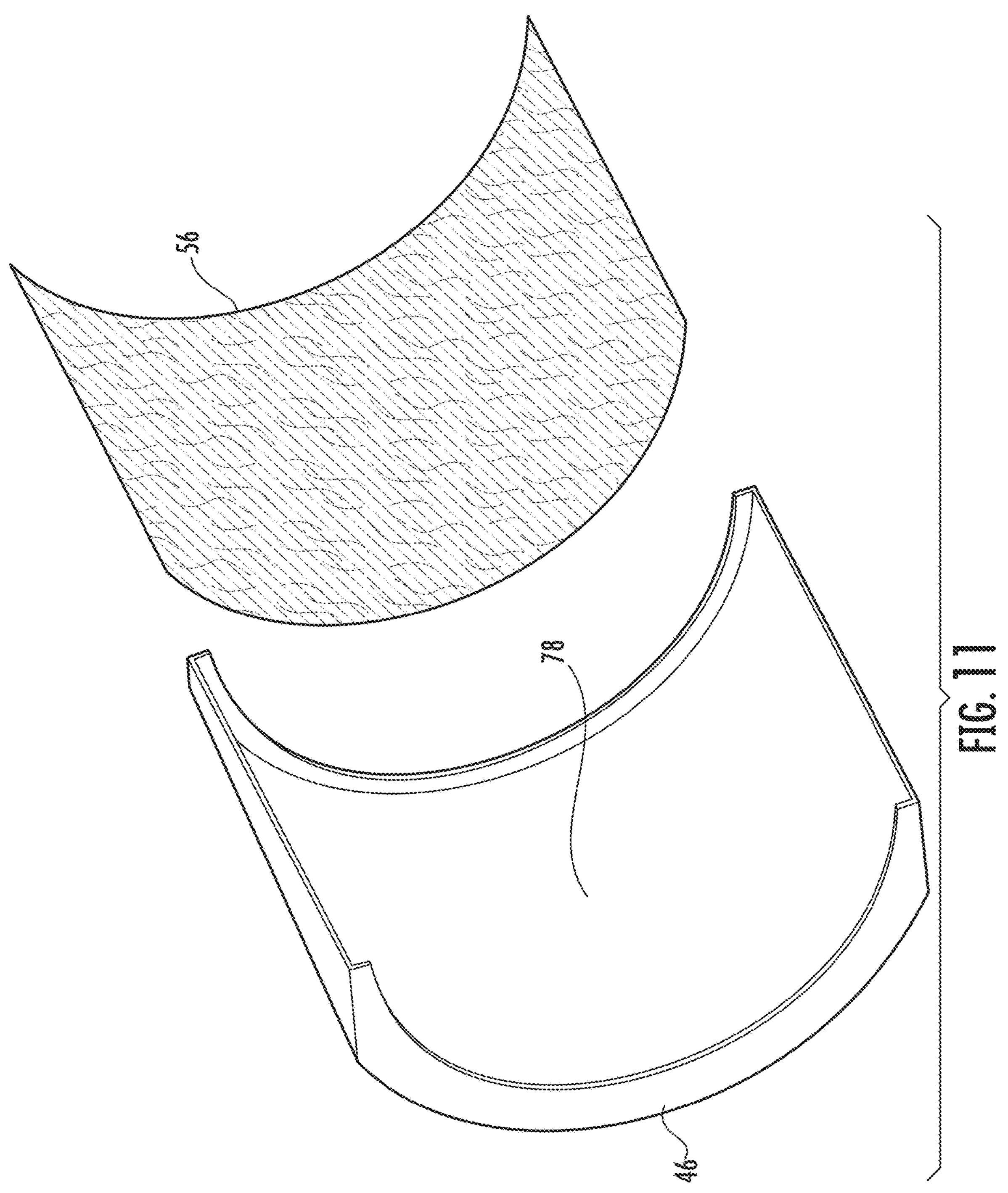
FIG. 11 shows an isometric view of a preformed rigid heat-activated strip in another embodiment for the end cap usable for the filter cartridge of FIG. 1.

In an alternative embodiment shown in FIG. 11, the adhesive end walls 50, 52 may include preformed heat activated strips 56 to connect one or more end caps 46, 48 to the filter media pack 12. Preferably, each heat activated strip 56 includes adhesive such as an epoxy, a urethane, or a hot melt. In this embodiment, the strips 56 are in solid form and in a relatively thin form that can be wrapped to the contour of the cavity of the end caps 46, 48.

The heat activated strips 56 may include other adhesives, such as polymers that have a solid state and that may at least partially transition to a fluid state sufficiently when heated.

The heat-activated strip 56 may optionally contain excitable material, such as metal particles, which is heated by electromagnetic induction to cause melting of the at least one heat-activated strip 56.

In any of the embodiments (liquid adhesive 54 or preformed strips of adhesive 56), as may be seen in FIG. 2, the end caps 46, 48 and the frame 28 can be bonded via the adhesive end walls 50, 52.

Figure 3:
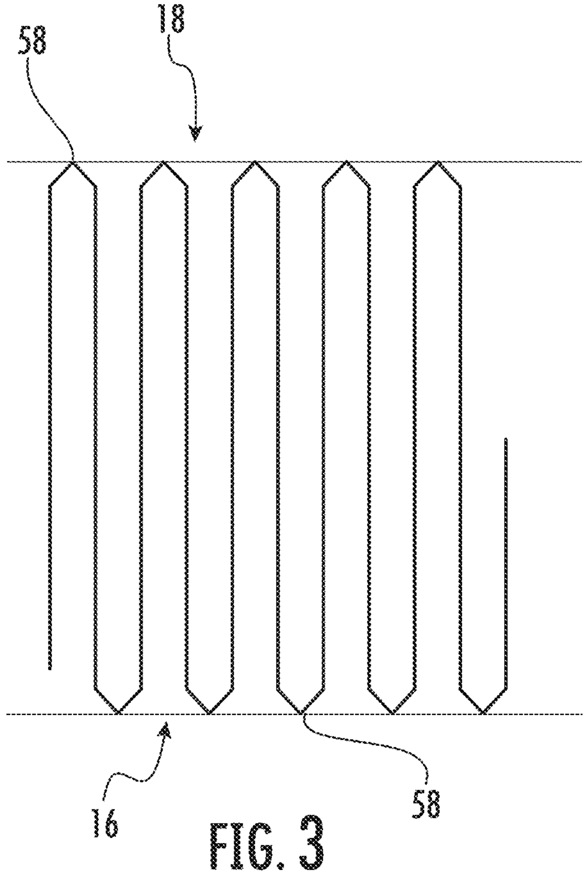
FIG. 3 shows a schematic view of the filter media sheet showing folds used in the filter cartridge of FIG. 1.

An additional view of filter media pack 12 is shown in FIG. 3, where it can be seen that the filter media sheet 14 includes a plurality of folds. The filter media sheet 14 is creased at spaced intervals to form a plurality of pleat tips 58, such that the pleats extend between pleat tips 58 at the inlet face 16 and pleat tips 58 at the outlet face 18.

Figure 4:
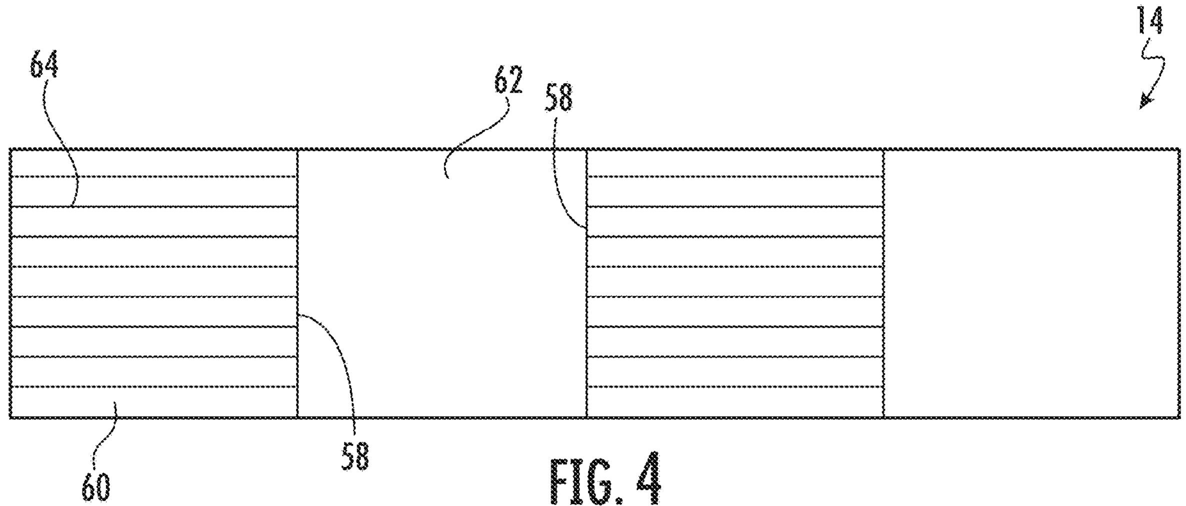
FIG. 4 shows a schematic view of creased and embossed pleat and flat panels of the filter media sheet of FIG. 3 before folding.

Further, as schematically shown in FIG. 4, the pleats include first pleat panels 60 having embossments 64 and second pleat panels 62 that are preferably free of embossments 64 (or second pleat panels 62 can also optionally be embossed with embossments 64, which may be offset from those of first pleat panels 60). The embossments 64 are disposed at least partially between the pleat tips 58. For example, suitable embossed deep pleat filter media packs 12 usable in the present disclosure are disclosed in U.S. Pat. No. 11,235,270 to Tate et al., the entire disclosure of which is hereby incorporated by reference. However, when pleat packs 12 are used, the width of the sheet 14 is varied to create bulging at one or both ends of the filter media pack 12 once formed.

Figure 5:
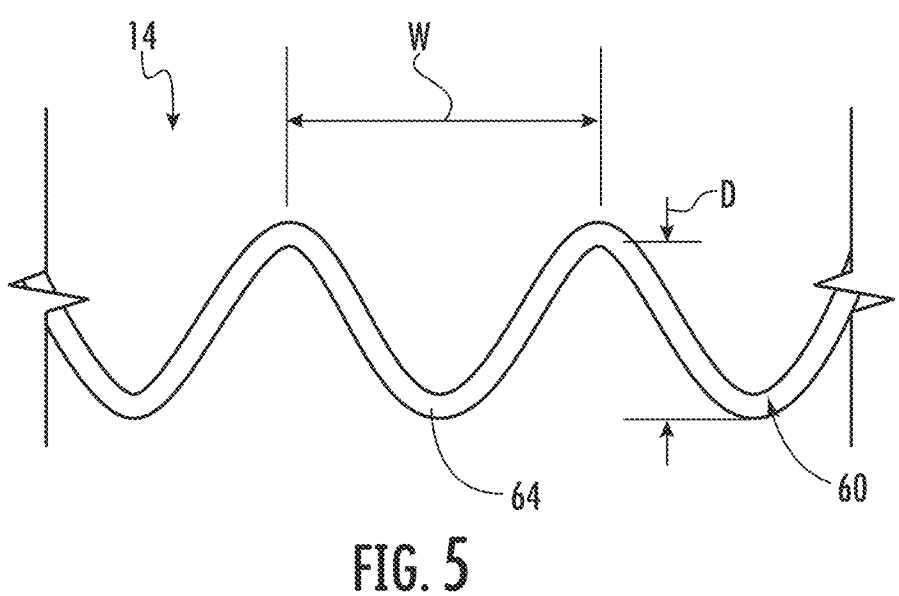
FIG. 5 shows a schematic cross-sectional view through an embossed pleat panel of the filter media pack.

In the schematic illustration of FIG. 5, the embossments 64 have a width (W) of at least 2.0 millimeters and a depth (D) of at least 2.0 millimeters.

Figure 7:
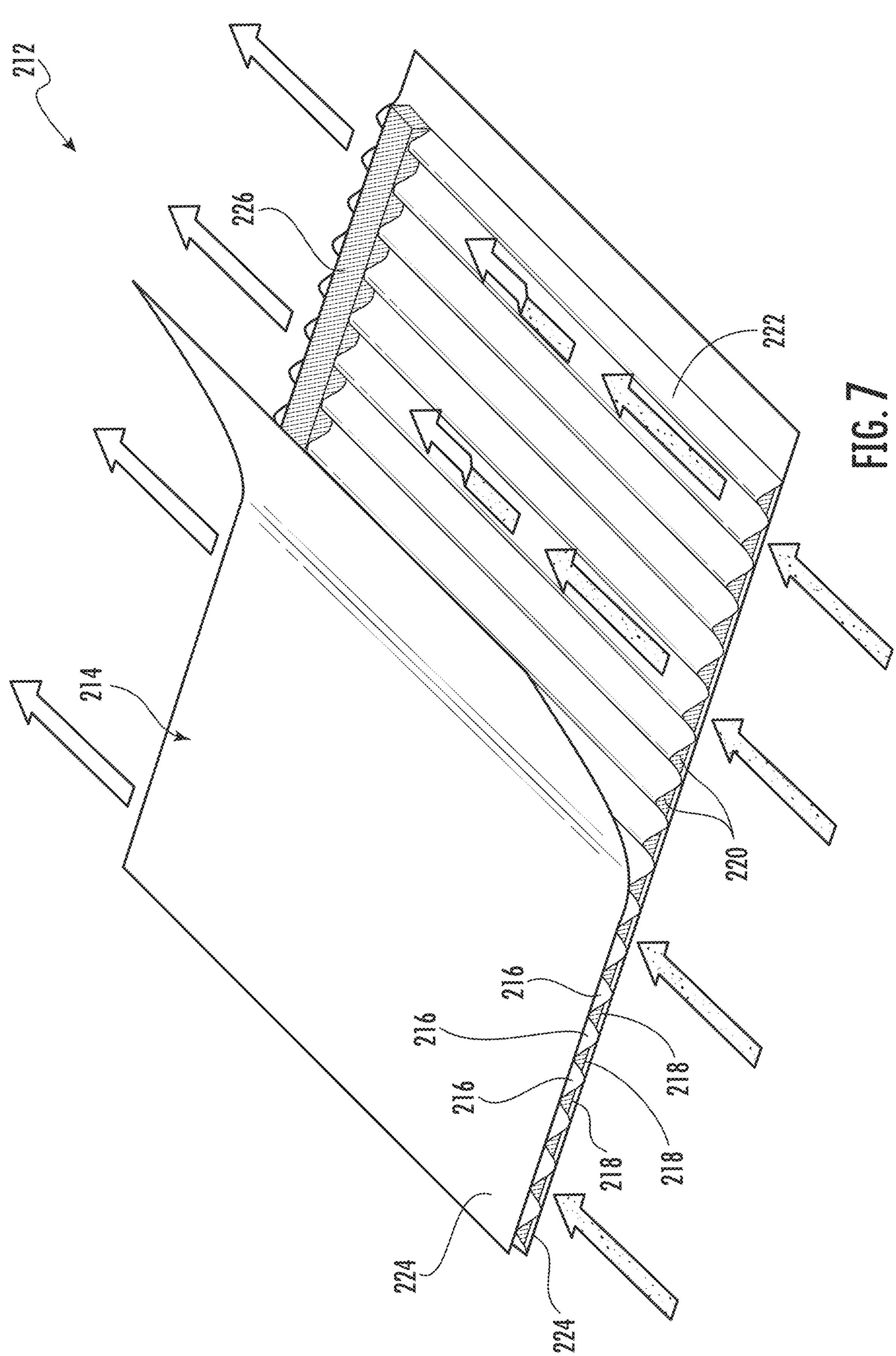
FIG. 7 shows an isometric view of another embodiment of the filter media pack, including cut sheets of fluted media used in place of the pleated media in the filter cartridge of FIG. 1.

FIG. 7 illustrates another embodiment of a filter media pack 212 with a plurality of stacked filter media sheets 214, including fluted media sheets 222 and face sheets 224. The rectangular peripheries of the sheets 214 are aligned to form the filter media pack 212 and can have variable widths to create alternatives to pleat packs and use in FIG. 1 instead.

The stacked sheets 214 of such a filter media pack provide flutes such as a corrugated-type arrangement with an upper row and a lower row. As shown in the configuration, the upper flutes form flute chambers 216 closed at the downstream end, while upstream closed end flutes are the lower row of flute chambers 218. The fluted chambers 218 are closed by a first end adhesive seal bead 220 filling a portion of the upstream end of the flute between the fluting sheet 222 and the lower facing sheet 224. Similarly, a second end adhesive seal bead 226 closes the downstream end of alternating flutes 216. The adhesive seal beads 220, 226 also secure the fluted and face sheets 222, 224 together.

Figure 8:
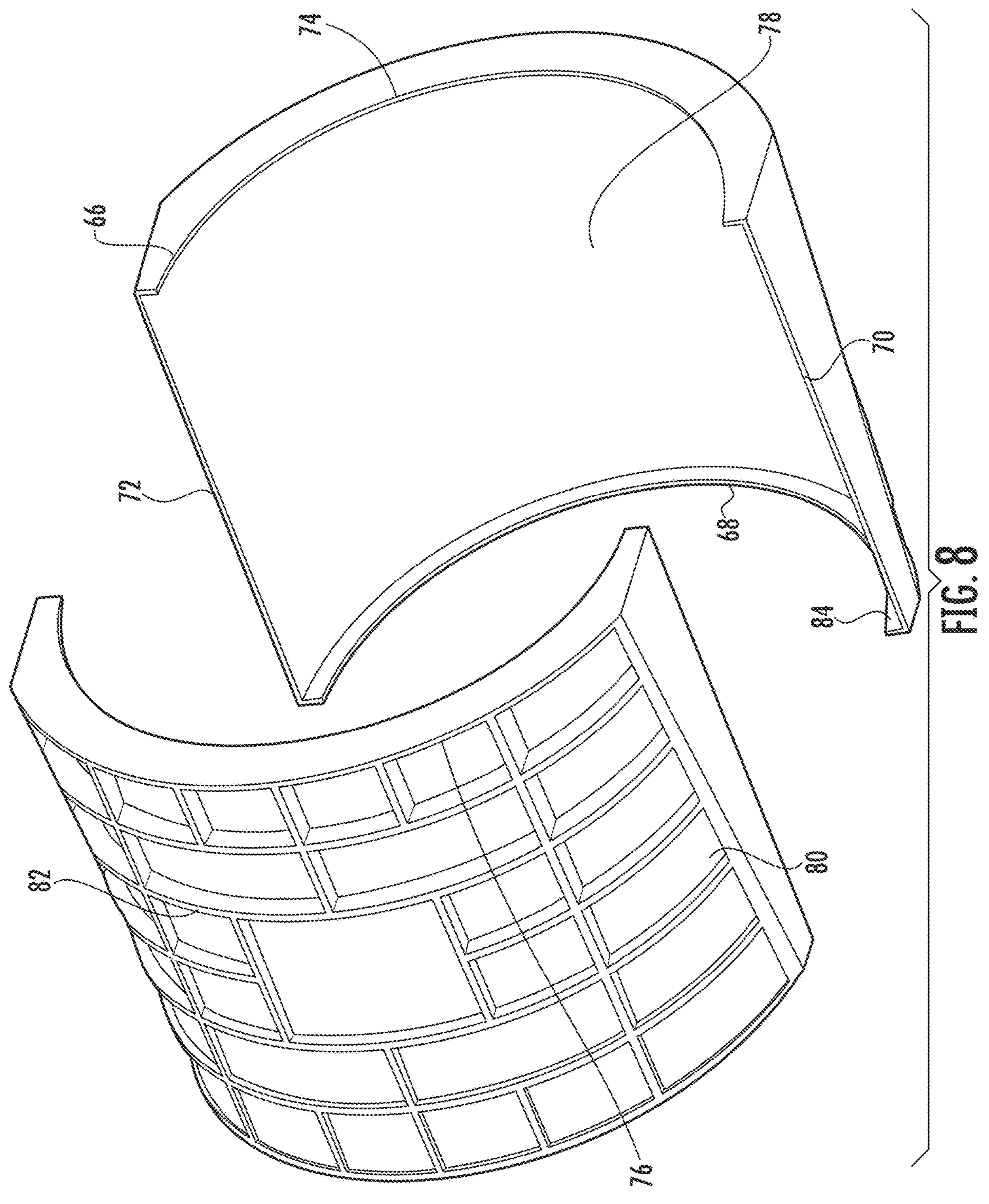
FIG. 8 shows an isometric view of the end caps of the filter cartridge of FIG. 1.

Each end cap 46, 48 may have additional features for better structural support and/or for adhesive retention. Turning now to FIG. 8, each end cap 46, 48 includes a pair of curved (or multifaceted) ledges 66, 68 and a pair of linear edges 70, 72 that extend along a border of a support panel. This creates the cavity for retention of the adhesive 94 placed therein and prevents adhesive 94 from spilling out of the end caps 46, 48 (see FIG. 2).

One curved ledge 66 overlaps the inlet face 16, while the other curved ledge 68 overlaps the outlet face 18. The linear edges 70, 72 traverse between the curved ledges 66, 68 of the support panel and overlap opposing sides 20, 22 of the filter media pack 12. This configuration provides an inward-facing border wall 74 that defines a curved (or multifaceted) cavity within each end cap 46, 48.

The curved ledges 66, 68 may include outward extended portions that provide, in conjunction with the linear edges 70, 72, an outward border wall 76 over a curved (or multifaceted) outer support face 80.

As illustrated in FIG. 8, each end cap 46, 48 may also include a plurality of ribs 82 that extend from the curved outer support face 80 of the support panel opposite a curved (or multifaceted) inner support face 78. When the end caps 46, 48 are assembled with the filter media pack 12, the ribs 82 extend across the outward border walls 76 to provide a rib support network.

The end cap 46, 48 may include short lips 84. The lips 84 extend inwardly toward the filter cartridge 10 to provide a short edge for the end cap 46, 48 to locate and sit atop the frame 28 that encloses the filter media pack 12. This configuration provides support for the frame 28.

Figure 9:
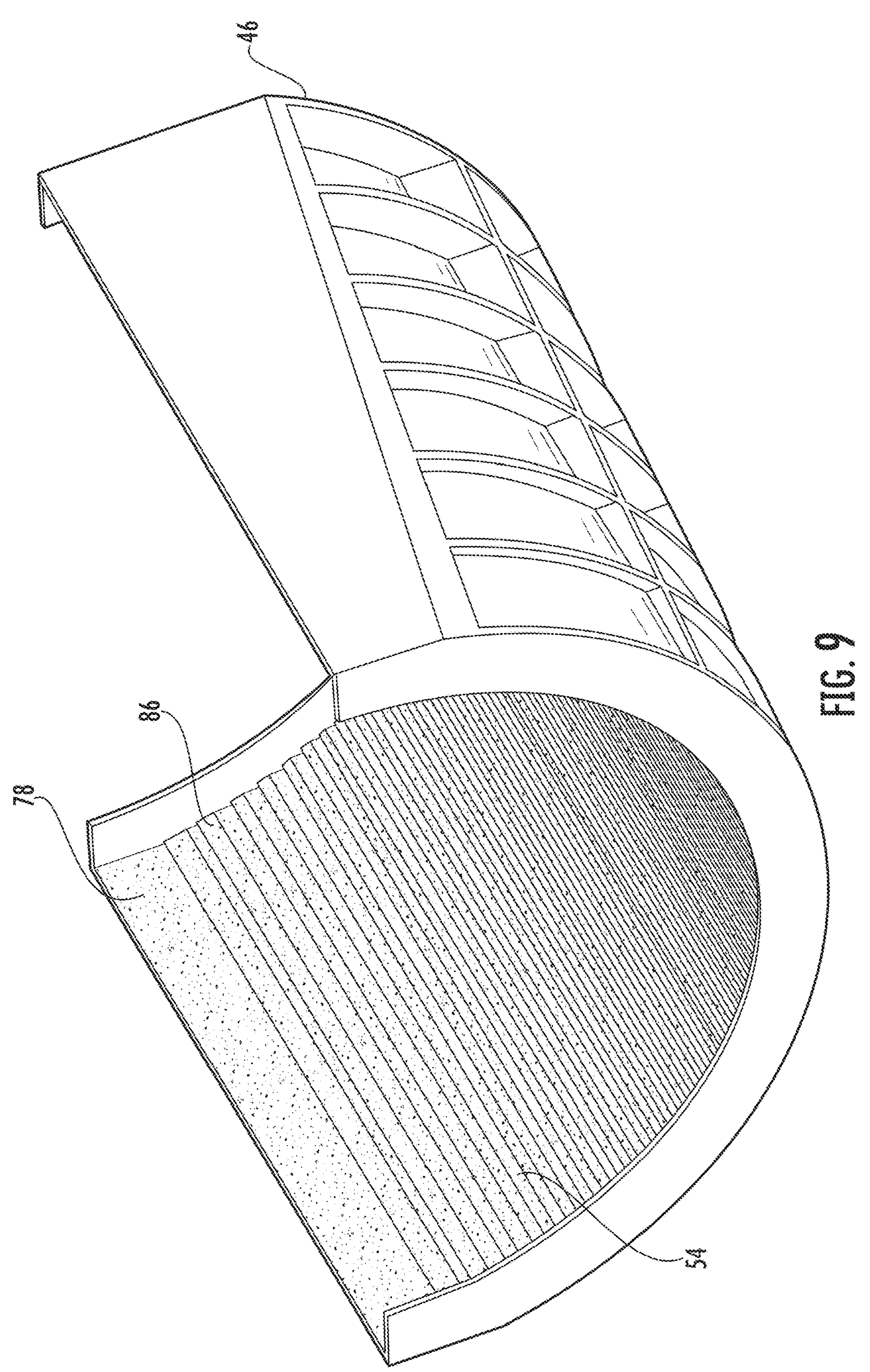
FIG. 9 shows an isometric view of an alternative embodiment of the end cap similar to that of FIG. 8 and usable in the FIG. 1 embodiment, with the end cap defining integral baffles for better retaining liquid adhesive.

Each end cap 46, 48 may feature a plurality of angled baffles 86 configured to retain uncured liquid adhesive 54. Turning to FIG. 9, a plurality of angled baffles 86 is integrated into the curved inner support face 78 of the end caps 46, 48. Each angled baffle 86 can have a different height and spacing from its neighbors. This configuration is extremely effective at minimizing the gravitational pooling of the liquid adhesive 54 in the curved end cap 46, 48.

The angled baffles 86 are preferably perpendicular (vertical orientation when applying end caps) to the primary flow of the liquid adhesive 54 and may form an angle with the curved inner support face 78 of the end cap 46, 48. Using baffles 86 that are vertical during the time of dispensing a liquid adhesive (see e.g. FIG. 14), however, other angles for the baffles maybe used that achieve the same function of retaining liquid adhesive away from the gravitational bottom, although not as efficiently. Preferably, the angled baffles 86 are between 2 and 7 millimeters long and parallel to each other as well as to the opposed sides 20, 22 of the filter media pack 12. Each angled baffle 86 is spaced a minimum of 1 millimeter apart from its neighbor (i.e. the size of the gap between adjacent baffles 86) and may be separated up to 25 millimeters to enhance the penetration of the adhesive 94 into the end caps 46, 48. Preferably, the spacing of the angled baffles 86 is the thickness of the ribs 82 themselves (and thus the thickness/width of the baffles 86 is also preferably between 1 millimeter and 25 millimeters). However, the spacing could vary depending on the radius of the curve (or multifaceted surface) that the potting surface makes. Therefore, the rib thickness and rib spacing may vary as well, for example, based upon the location along the curved surface and need not be uniform, but in any event, even with the variance, the spacing and rib thickness preferably fall within the parameters discussed above.

Figure 10:
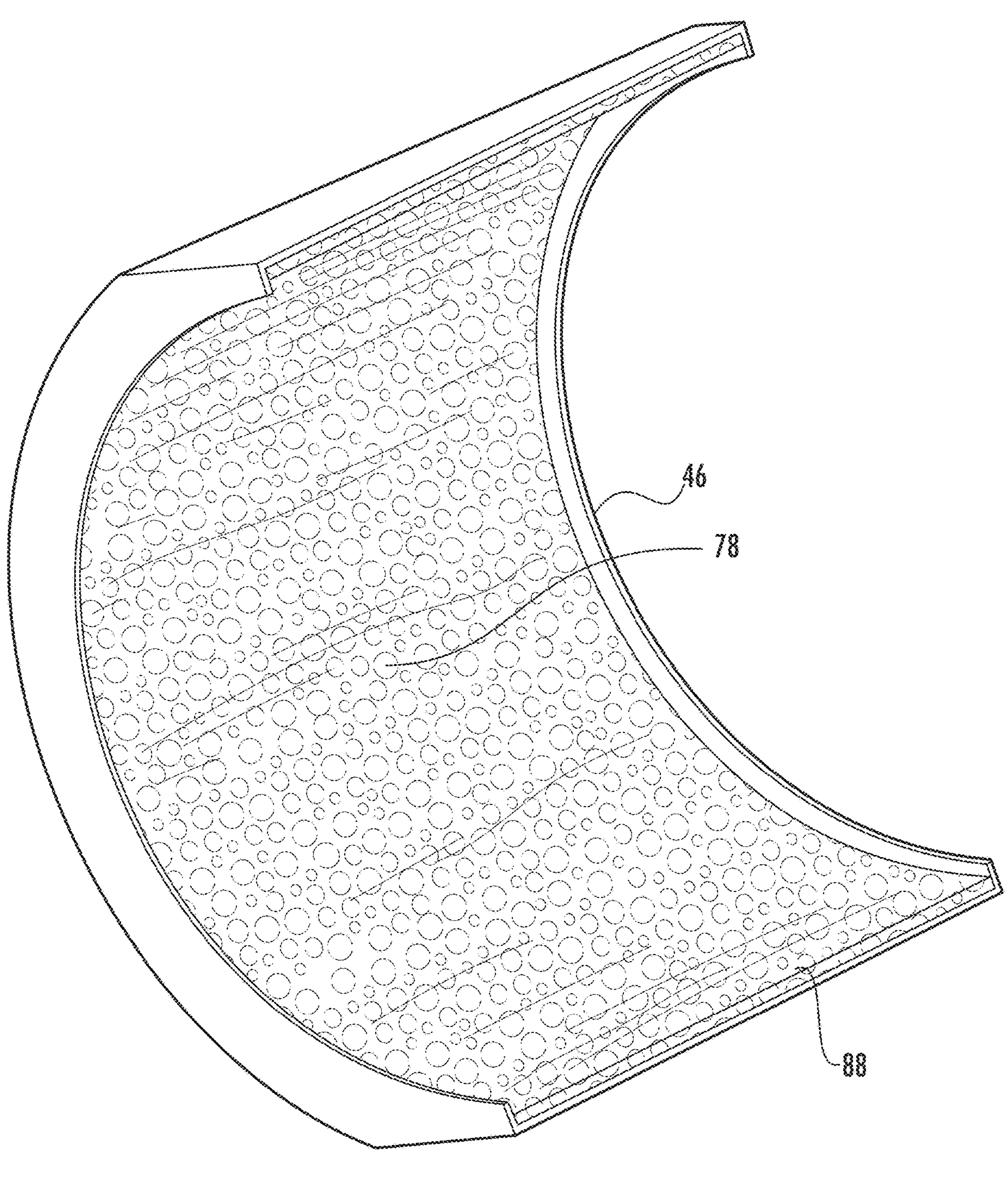
FIG. 10 shows an isometric view of another embodiment of the end cap usable for the filter cartridge of FIG. 1, further including an adhesive retainer insert such as an open cell foam pad.

In a further embodiment, as shown in FIG. 10, a permeable baffling, for example such as a foam core pad 88 may be additionally inserted and attached (e.g., glued with adhesive) to the curved (or multifaceted) inner support face 78 of the end caps 46, 48.

Permeable baffling (such as the foam core pad 88) preferably covers the entire curved inner support face 78. The foam core pad 88 wicks a less viscous or non-viscous liquid urethane adhesive 54 (see FIG. 2). Subsequently, as the filter media pack 12 is pressed into the end caps 46, 48, the urethane is squeezed out of the foam 88 and wicks into the filter media pack 12.

The foam pad 88 can preferably be open cell for the liquid adhesive 54 to readily soak in. For example, the foam pad 88 can be similar to a blown insulation, where there are randomly staggered layers of fibers that stack up to create the thickness of the foam pad 88. The foam pad 88 needs to have a low density to allow the liquid adhesive 54 to quickly soak into the foam, like a sponge. For example, a synthetic non-woven non-urethane foam can be used, and other examples include but are not limited to reticulated foam or polyurethane foam.

Other permeable matts of cloth, fibrous matters or other materials that hold and/or wick adhesive may also be used as such permeable baffling.

In another embodiment, as shown in FIG. 11, the filter cartridge 10 may include the filter media pack 12 arranged between the end caps 46, 48 with at least one heat activated strip 56 (to substitute for liquid adhesive 54 and provide the adhesive 94 in FIG. 2) secured to each end cap 46, 48. It is understood that end cap 46 and end cap 48 can be the same and interchangeable.

Each heat activated strip 56 is enclosed in the end caps 46, 48 in solid form prior to placement with the ends 24, 26 of the filter media pack 12.

Prior to heat application, the heat activated strips 56 may be bonded using a number of retaining means, such as a glue tab, spot welding, and gravity, to mention a few.

Once the components of the filter cartridge 10 are assembled into the unbonded filter media pack 12, the heat activated strips 56 are thereby softened to cause embedding of the filter media pack ends 24, 26 into the heat activated adhesive material of the heat activated strip 56.

The heat activated strips 56 are heat activated sufficiently to soften and allow embedding of the filer media pack 12 at a temperature of at least 120 degrees Celsius.

While in some embodiments, one heat activated strip 56 may be used, a plurality of the at least one heat activated strip 56 may be placed between the end caps 46, 48 of the filter cartridge 10.

Figure 12:
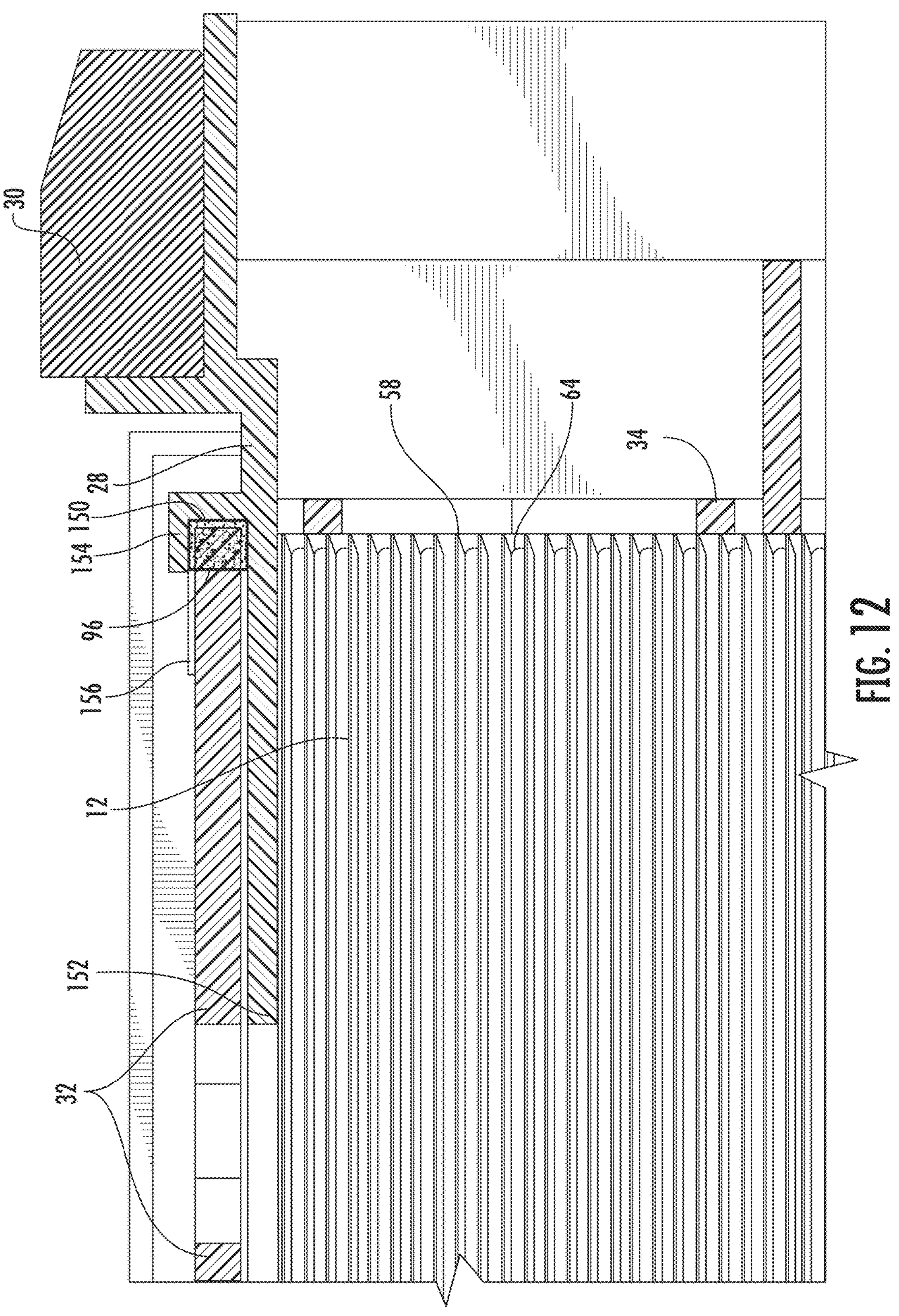
FIG. 12 shows an enlarged portion of a cross-sectional view of the filter cartridge of FIG. 1, taken along the line 302-302.

With reference now to FIG. 12, the same illustrates a cross-sectional view of the filter cartridge 10 taken along the line 302-302 in FIG. 1. The adhesive bead 96 is used to provide a filter media-to-frame sealing. This sealing is accomplished by lapping adhesive bead 96 over a small protrusion located on the interior of the frame 28, contacting the filter media pack 12. The filter media-to-frame adhesive bead 96 also provides an airtight seal for unfiltered air flow.

Additionally, as shown in FIG. 12, a bonded joint is formed at the channel 150 of the frame 28. That bonded joint is to create a seal to prevent unfiltered airflow past the sides 20, 22 of the filter media pack 12, and it is on both sides 20, 22 of the filter media pack 12. These are linear seals 96 on the opposing sides 20, 22 that join with the pool of adhesive 94 at the opposing end caps 46, 48, such that an entire periphery of the filter media pack 12 is sealed by the adhesive 94 in the end caps 46, 48 and the linear seals 96 on the opposite sides 20, 22 to prevent unfiltered air flow, and thereby fluid is directed to flow from the inlet face 16 through the filter media 12 (filtering out undesired contaminants) toward the outlet face 18 for exiting the filter cartridge 10.

FIG. 13 shows a cross-sectional view of the filter cartridge 10 taken along the line 304-304 in FIG. 1. As can be seen, the lips 84 provide a short edge for the end caps 46, 48, and sit atop the frame 28 to impart structural support to the filter cartridge 10 as a whole.

The frame 28 has a grate 34 with appropriate perforations 37 and does not cover the side edges of the filter media pack 12. The oval mouth of the frame 28 supports internal cross pieces across the outlet face 18 of the filter media pack 12 for additional support. In addition, the preformed gasket 30 secured to the oval mouth provides a seal against a corresponding opening in the filter housing (not shown).

The end caps 46, 48 are relatively thin, and the inside curvature of the end caps 46, 48 corresponds to the curvature of the ends 24, 26 of the filter media pack 12, such that the inside surface 78 of the end caps 46, 48 aligns with the pleat tips 58.

FIG. 14 shows a cross-sectional view of the filter cartridge 10 taken along the line 306-306 in FIG. 1. An interior dam 92 is formed on the curved inner support face 78 of the end cap 46, 48 that can be facilitated due to baffles 86. The adhesive 94 suitable for fixing is poured into the dam 92.

A trough may be created to minimize gravitational pooling of adhesive 94 and to maintain uniform distribution of adhesive 94 across the curved inner support face 78. Retainer angled baffles 86 are arranged at locations away from an apex of the inner support wall 74. In this manner, a barrier is provided to hold the filter media-to-end cap adhesive 94. Subsequently, the end caps 46, 48 are bonded directly to the ends 24, 26 of the filter media pack 12.

Figure 15:
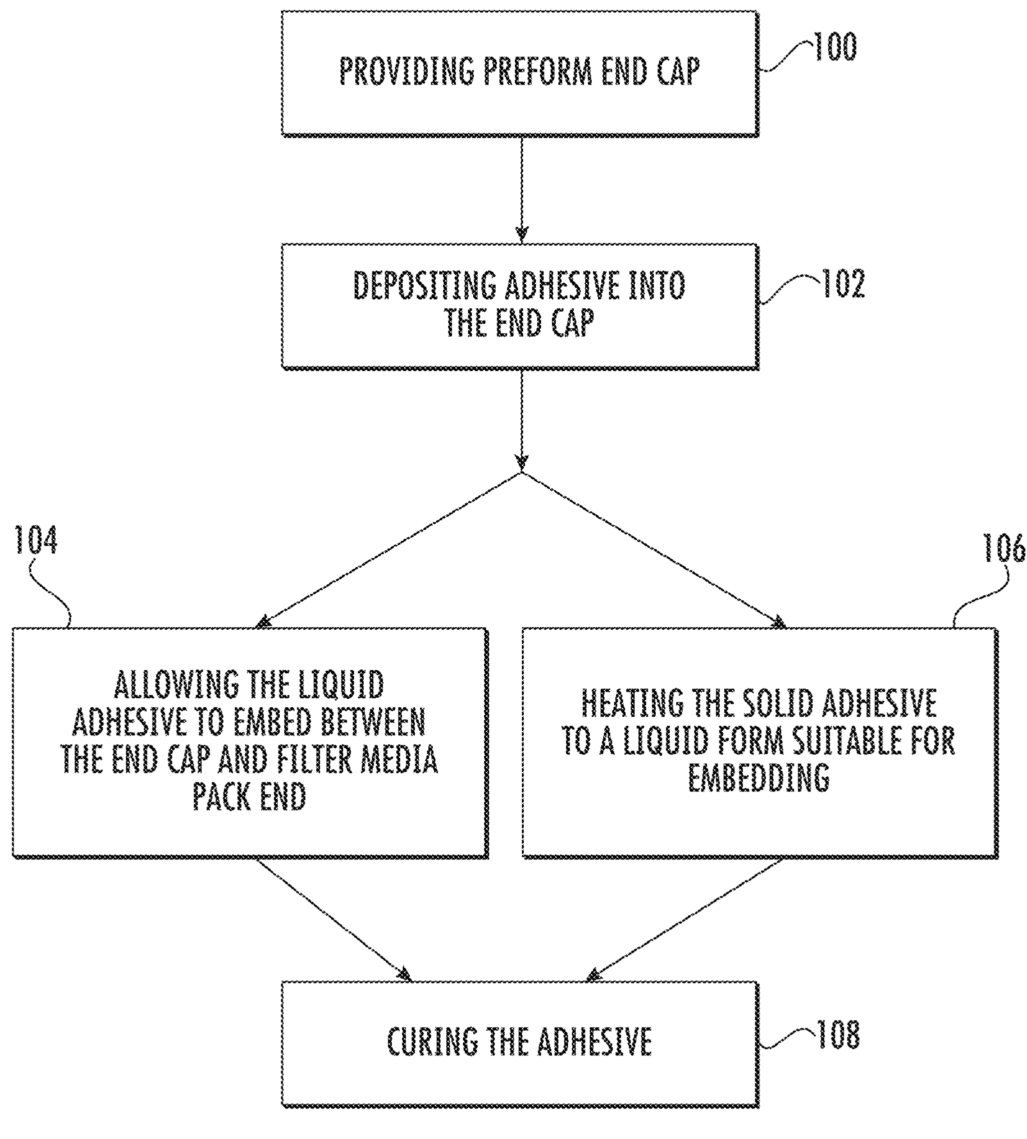
FIG. 15 shows a flow-chart of an embodiment of a method according to the teachings herein.

FIG. 15 shows a flow-chart of an embodiment of a method according to the present application. In particular, a method for manufacturing the previously described filter cartridge 10 is shown.

In an initial step 100, a preform end cap 46, 48 that matches the geometry of a filter media pack end 24, 26 is provided.

In a step 102, an adhesive 94 is deposited into the end cap 46, 48.

In a step 104, the liquid adhesive 54 flows and embeds between the end cap 46, 48 and the filter media pack end 24, 26.

In an alternative step 106, the solid adhesive 56 is first heated to a liquid form suitable for embedding.

In a final step 108, the adhesive 94 is cured.

The result of such a process is the filter cartridge 10 shown in FIG. 1 with the filter media pack 12 embedded into adhesive 94 to the end caps 46, 48.

Throughout this disclosure reference is made to curved (or multifaceted) or similar terms. By that it is understood that the surfaces 24, 26 may either be curved or multifaceted, or both; and that the end cap 46, 48 features including the overall shape as well as their inner and/or outer support faces 78,80 can either curved or multifaceted or both. Thus, while FIGS. 1, 2, 8-11 show an actual curve and arcuate shape to features, those features may alternatively be multifaceted as understood from review FIG. 6 showing a multifaceted end (with two facets making up the end). Furthermore, a curved filter surface could be used with a multi-faceted end cap and vice versa. When multifaceted configurations are used and while at least two facets may be used in such an embodiment as in FIG. 6 for either opposed surfaces 24, 26, more typically each opposed surface 24, 26 would include 3 or 4 facets (and as noted above 5 or more facet along one of the overall four sides is considered effectively to be "curved")

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The use of the term "or" shall mean inclusive or (e.g. any one or more from the group joined by the conjunction "or" is present—for example, a or b is satisfied if a is present but not b, b is present but not a, or both a and b are present), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge, comprising:

a filter media pack comprising a filter media sheet, the filter media pack having an inlet face, an outlet face, opposite first and second sides, opposite first and second ends, the sides and the ends extending transversely between the inlet face and the outlet face, the sides extending transversely between the ends, wherein the first end bulges outwardly or inwardly from the opposite sides to define a first bulged face; and a first adhesive end wall embedded into the first bulged face of the first end;

a second adhesive end wall embedded into the second end; and wherein the first adhesive end wall and the second adhesive end wall are provided as discrete adhesive bodies at respective first and second ends.

2. The filter cartridge of claim 1, wherein the second end bulges outwardly or inwardly from the opposite sides to define a second bulged face, and the second adhesive end wall embedded into the second bulged face of the second end.

3. The filter cartridge of claim 2, further comprising first and second preform end caps retaining the first and second adhesive end walls, respectively, each preform end cap including a support panel defining an arcuate or multifaceted inner support face retaining one of the adhesive end walls.

4. The filter cartridge of claim 3, further comprising a frame mounted over either the inlet face or the outlet face, the frame supporting an annular gasket having free defining sealing surface, the frame overlapping with each of the first and second preform end caps.

5. The filter cartridge of claim 4, wherein the frame is bonded with the first and second preform end caps via the first and second adhesive walls, respectively.

6. The filter cartridge of claim 4, wherein the frame is snap fit with the first and second preform end caps.

7. The filter cartridge of claim 2, further comprising a permeable baffle holding adhesive of the adhesive end wall within the first and second preform end caps and integrally bonded between the first and second preform end caps and the first and second bulged faces, respectively.

8. The filter cartridge of claim 1, wherein the first bulged face is curved or multifaceted to define a curved end face or a multifaceted end face.

9. The filter cartridge of claim 8, wherein the first bulged face protrudes outwardly to define an outwardly curved or multifaceted ridge face.

10. The filter cartridge of claim 8, further comprising a preform end cap retaining the first adhesive end wall, the preform end cap comprises a pair of curved or multifaceted ledges and a pair of linear edges extending along a border of a support panel to provide an inward facing border wall defining a curved or multifaceted potting cavity over the curved end face or the multifaceted end face, with one curved or multifaceted ledge overlapping the inlet face and the other curved or multifaceted ledge overlapping the outlet face, and the linear edges traversing between the curved or multifaceted ledges of the support panel and overlapping opposite sides of the filter media pack, respectively.

11. The filter cartridge of claim 10, wherein the preform end cap comprises a plurality of ribs extending from a curved or multifaceted outer support face of the support panel opposite of the curved or multifaceted inner support face, and wherein the curved or multifaceted ledges have outward extending portions providing in conjunction with the linear edges an outward border wall over the curved or multifaceted outer support face, the ribs extending across the outward border wall to provide a rib support network.

12. The filter cartridge of claim 3, wherein the adhesive end walls comprise cured liquid adhesive retained by the preform end caps, the liquid adhesive comprising a urethane, a hotmelt, a plastisol, or an epoxy.

13. The filter cartridge of claim 1, wherein the adhesive end wall comprises preformed heat activated strips that have been heat activated embedded into the filter media pack, the preformed heat activated strips comprising at least one of epoxy, a urethane, and a hot melt, the preformed heat activated strips turning to liquid form sufficient for embedding at a temperature of at least 120 degrees Celsius.

14. The filter cartridge of claim 1, wherein the filter media pack is a pleat pack with the filter media sheet folded into a plurality of pleats providing a plurality of inlet pleat tips at the inlet face and a plurality of outlet pleat tips at the outlet face, the pleats defining a width extending between opposed ends, with at least some of different pleats having different widths including a widest width and narrowest width, with the widest width greater than the narrowest width by at least 1.0 centimeters.

15. The filter cartridge of claim 1, wherein the filter media pack comprises stack of fluted sheets and stack of face sheets, with alternating inlet and outlet seal strips the adjacent fluted and face sheets at the inlet face and the outlet face, respectively.

16. The filter cartridge of claim 1, wherein the filter media pack is configured in an oval, rounded, or race-track configuration.

17. The filter cartridge of claim 8, further comprising a preform end cap retaining the first adhesive end wall, the preform end cap having a support wall facing the first bulged face with a contour matched to the first bulged face, and wherein a plurality of retainer baffles are arranged along the support wall, with at least some of the retainer baffles at locations away from an apex of the support wall configured to retain uncured liquid adhesive that forms the first adhesive end wall.

18. The filter cartridge of claim 1, further comprising a preform end cap of thermoplastic polymer material having an inner surface directly embedded into the first bulged face of the first end, wherein the thermoplastic polymer material provides the first adhesive end wall.

19. The filter cartridge of claim 1, wherein the first adhesive end wall provides a mold-in-place end cap.

20. The filter cartridge of claim 2, wherein the first and second adhesive end walls provides respective mold-in-place end caps.

21. A method of manufacturing a filter cartridge, the method comprising:

creating a variable width to a filter media pack which comprises a filter media sheet, the filter media pack having an inlet face, an outlet face, opposite first and second sides, opposite first and second ends, the sides and the ends extending transversely between the inlet face and the outlet face, with panels of the filter media sheet extending between the inlet face and the outlet face, the variable width extending between opposed ends such that different members of at least some of the panels have a different width with a widest member of the panels providing widest width and a narrowest member of the panels providing narrowest width, with the widest width greater than the narrowest width by at least 1.0 centimeter, in a manner that at least the first end bulges outwardly or inwardly from the opposite sides to define a first bulged face; and embedding a first adhesive end wall into the first bulged face at the first end to seal the first bulged face; and embedding a second adhesive end wall into the second end as a discrete adhesive body apart from the first adhesive end wall.

22. The method of claim 21, wherein the second end bulges inwardly or outwardly to define a second bulged face, and further comprising embedding the second adhesive end wall into the second bulged face to seal the second bulged face.

23. The method of claim 21, further comprising retaining the first adhesive end wall in a preformed end cap during application to the first bulged face.

24. The method of 23, further comprising dispensing the first adhesive end wall into the preformed end cap in a liquid form prior to application to the first non-planar end face, and thereafter curing the liquid form to solidify the first adhesive end wall.

25. The method of claim 23, further comprising placing the first adhesive end wall as preformed heat activated strips into the preform end caps, and thereafter heating the preformed heat active strips to a liquid form sufficient for embedding at a temperature of at least 120 degrees Celsius.

26. The method of claim 23, further comprising overlapping lips of the preformed end cap over sides and inlet and outlet faces of the filter media pack.

27. The method of claim 26, further comprising arranging a frame over the inlet face or the outlet face and bonding the preformed end cap and the frame with the first adhesive end wall.

28. The method of claim 21, further comprising softening an inner surface of a thermoplastic polymer material of a preform end cap and applying the softened inner surface to the first bulged face to provide for the adhesive end wall via the thermoplastic polymer material of the preform end cap.

29. The method of claim 21, further comprising molding the first adhesive end wall to the first bulged face with a mold, and releasing mold from the first adhesive end wall such that the first adhesive end wall provides a mold-in-place end cap.

30. The method of claim 22, further comprising molding the first and second adhesive end walls to the first and second bulged faces with at least one mold, and releasing the at least one mold from the first and second adhesive end walls such that the first and second adhesive end walls provide first and second mold-in-place end caps, respectively.

31. A filter cartridge, comprising:

a filter media pack having an inlet face, an outlet face, and ends extending transversely to the inlet and outlet faces, each of the ends having an external non-planar, curved or multifaceted geometry;

a pair of end caps located against each end, each end cap having an internal surface with a geometry closely matching the geometry of the associated filter media pack end; and a potting adhesive disposed between and fixing the filter media pack and the end caps together; and wherein the first end cap and the second end cap are spaced apart and provided as separately potted end caps.

32. The filter cartridge of claim 31, further including a frame supporting the filter media pack, the end caps each having a lip or edge geometry that locates and supports the frame.

33. The filter cartridge of claim 32, further comprising a U-shaped grate, with a perforated end panel mounted over either the outlet face or the inlet face, and with perforated side panels mounted over opposed sides, the perforated end panel and the perforated side panels connected at corners.

34. The filter cartridge of claim 31, wherein the ends bulge outwardly from opposite sides to define a first outwardly bulged curved or multifaceted face and a second outwardly bulged curved or multifaceted face.

35. The filter cartridge of claim 31, wherein the potting adhesive forms first and second adhesive end walls embedded into the first and second outwardly bulged curved or multifaceted faces to seal the filter media pack to unfiltered airflow through the ends.

36. The filter cartridge of claim 35, wherein the adhesive end walls are dispensed in a liquid form into the end caps prior to application to the outwardly bulged curved or multifaceted faces, and thereafter cured to solidify.

37. The filter cartridge of claim 35, wherein each end cap includes a support wall facing the outwardly bulged curved face with a contour matched to the outwardly bulged curved or multifaceted face, and wherein the support wall includes a plurality of retainer baffles configured to retain uncured liquid adhesive.

38. The filter cartridge of claim 31, wherein the potting adhesive comprises preformed heat activated strips that have been heat activated embedded into the filter media pack, the preformed heat activated strips comprising at least one of epoxy, a urethane, and a hot melt, the preformed heat activated strips turning to liquid form sufficient for embedding at a temperature of at least 120 degrees Celsius.

39. The filter cartridge of claim 31, further comprising a frame mounted over either the inlet face or the outlet face, the frame supporting an annular gasket having free defining sealing surface, the frame overlapping with each of the end caps.

* * * * *